United States Patent [19]

Eguchi

[11] Patent Number: 5,929,593
[45] Date of Patent: Jul. 27, 1999

[54] CHARGING CONTROL APPARATUS USING VARIABLE INTERMITTENT CURRENT CHARGING

[75] Inventor: Yasuhito Eguchi, Kanagawa, Japan

[73] Assignee: Sony Corporation, Tokyo, Japan

[21] Appl. No.: 08/539,869

[22] Filed: Oct. 6, 1995

[30] Foreign Application Priority Data

Oct. 7, 1994 [JP] Japan ................................. 6-243847

[51] Int. Cl.⁶ .................................................. H02J 7/00
[52] U.S. Cl. .............................................. 320/21; 320/39
[58] Field of Search ................................ 320/21, 22, 31, 320/32, 39

[56] References Cited

U.S. PATENT DOCUMENTS

| | | | |
|---|---|---|---|
| 3,576,487 | 4/1971 | Chase | 320/39 |
| 3,617,851 | 11/1971 | DuPuy et al. | 320/22 |
| 3,987,353 | 10/1976 | Macharg | 320/39 |
| 4,745,349 | 5/1988 | Palanisamy et al. | 320/22 |
| 4,878,007 | 10/1989 | Gabor et al. | 320/14 |
| 5,291,117 | 3/1994 | Rydborn | 320/21 |
| 5,352,967 | 10/1994 | Nutz et al. | 320/20 |
| 5,396,163 | 3/1995 | Nor et al. | 320/21 |
| 5,412,306 | 5/1995 | Meadows et al. | 320/20 |
| 5,481,174 | 1/1996 | Martin et al. | 320/14 |

FOREIGN PATENT DOCUMENTS 0 584 362 A1  3/1994  European Pat. Off. ................. 320/21

Primary Examiner—Peter S. Wong
Assistant Examiner—Gregory J. Toatley, Jr.
Attorney, Agent, or Firm—Jay H. Maioli

[57] ABSTRACT

A battery charging control apparatus for controlling charging of a secondary battery has a FET which is so controlled that the supply of a charging current is suspended after being forcibly supplied to the secondary battery for a predetermined charging time, when the voltage of the secondary battery has risen to a level equal to or higher than a predetermined reference voltage, and, after the battery voltage has come down to the reference voltage during the suspension of the supply of the charging current, forced supply of the charging current is commenced again, thus realizing intermittent charging. The FET also is so controlled as to vary the above-mentioned charging time in accordance with the progress of charging of the secondary battery.

9 Claims, 33 Drawing Sheets

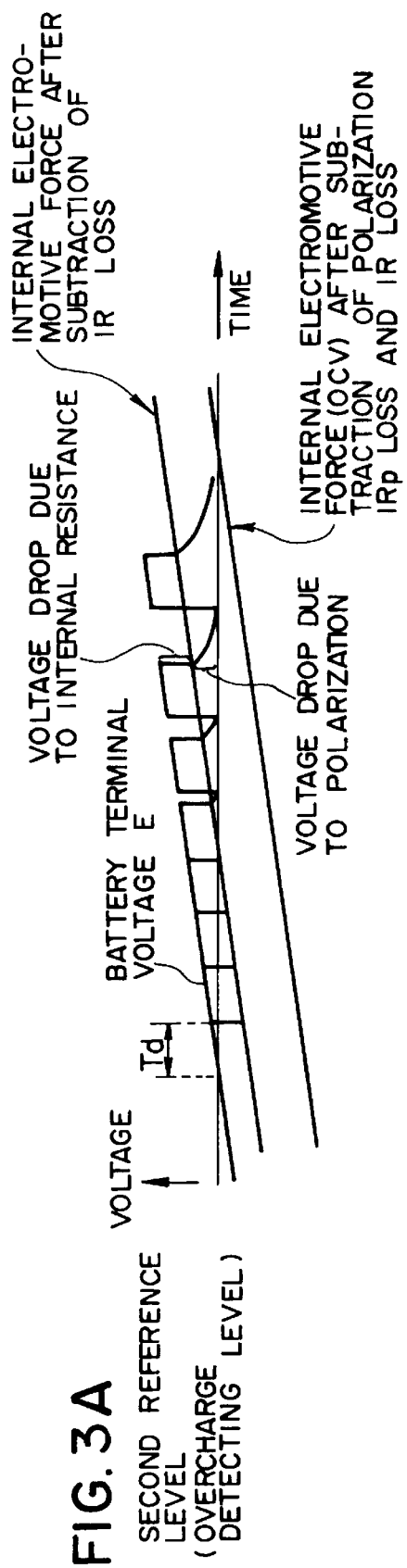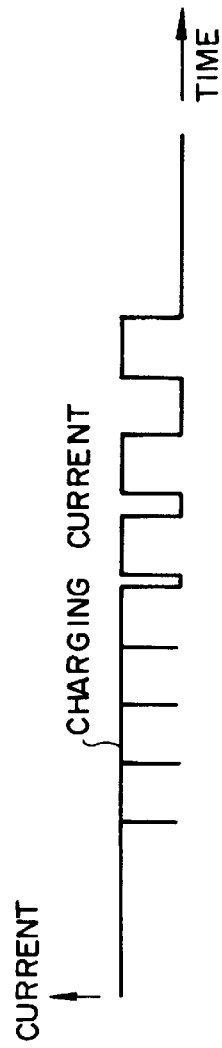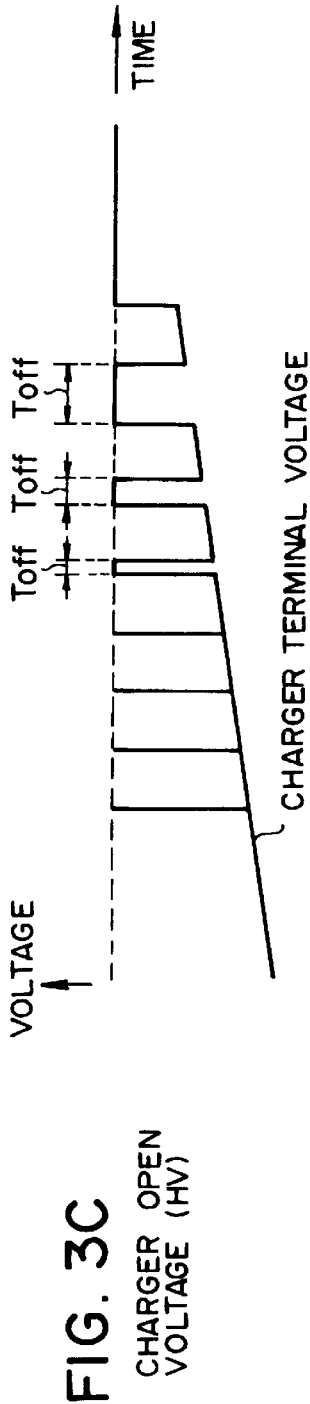
FIG. 3A
FIG. 3B
FIG. 3C

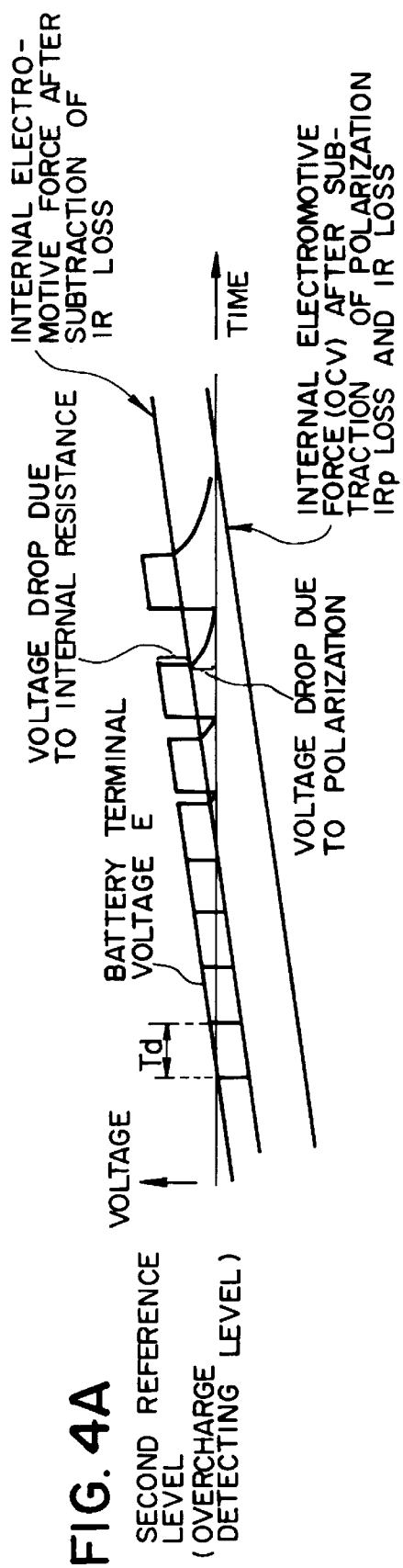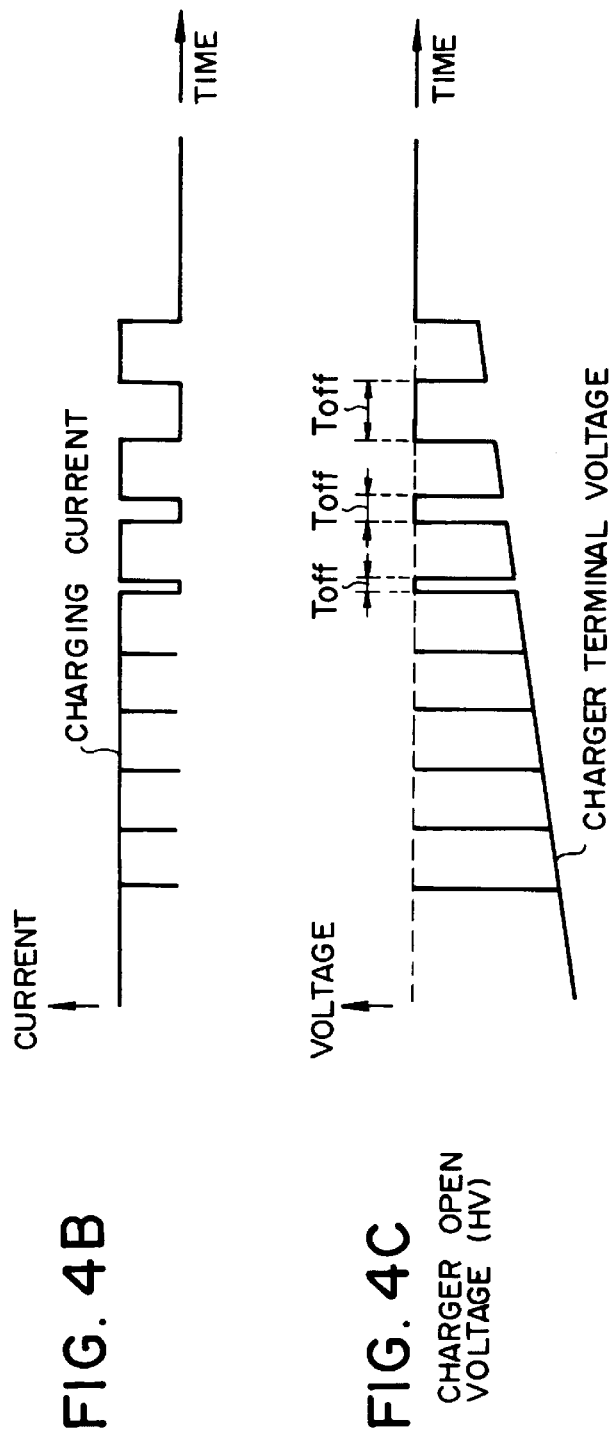
FIG. 4A
FIG. 4B
FIG. 4C

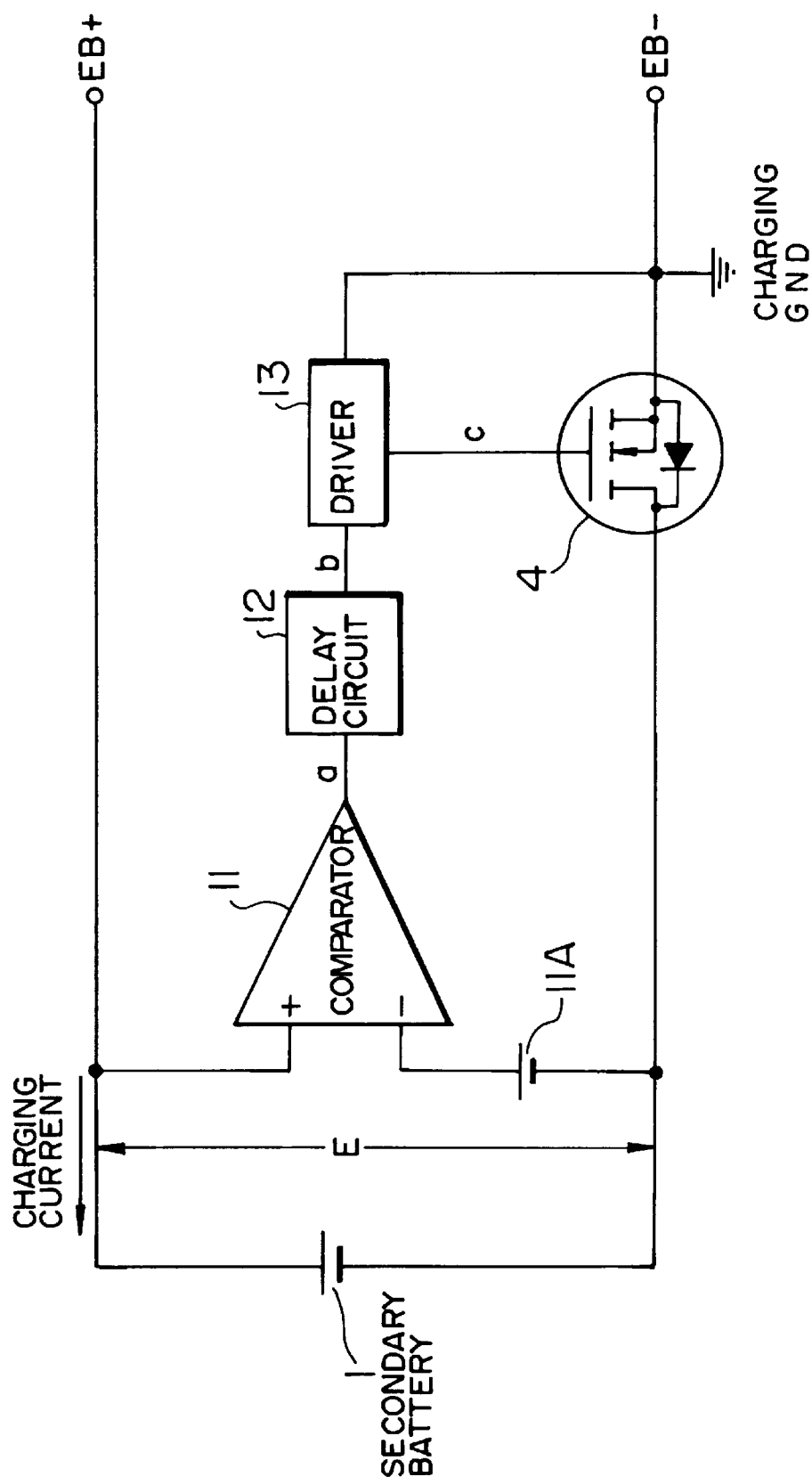

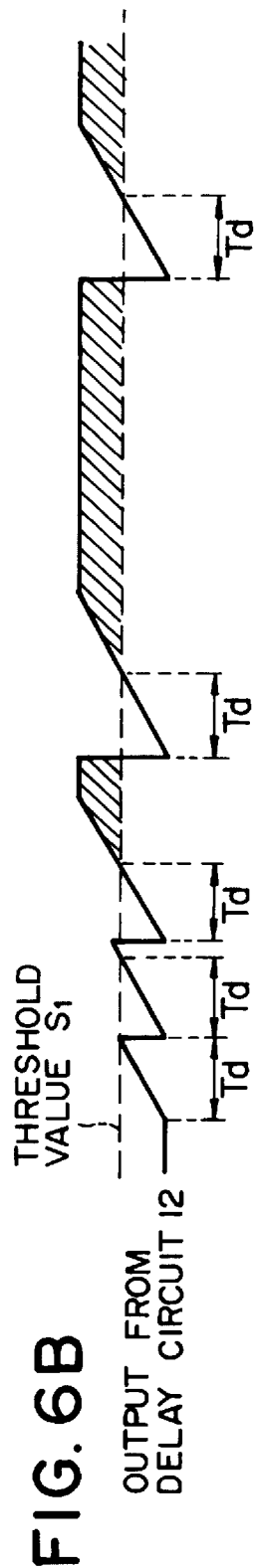
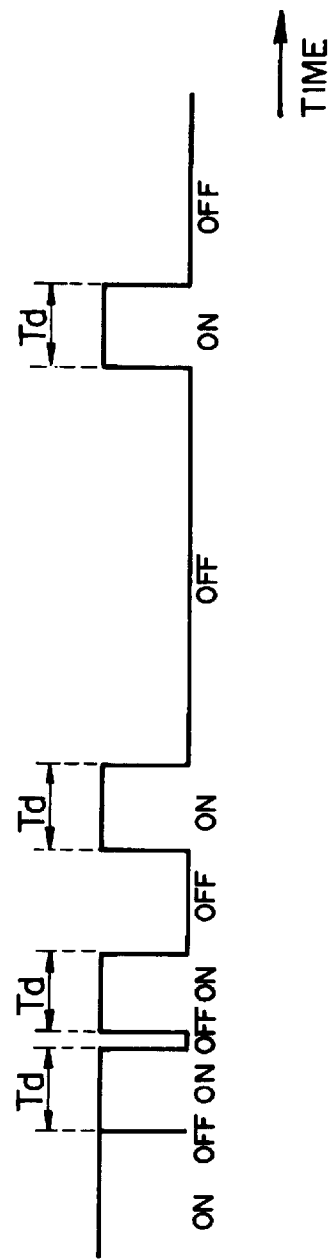
FIG. 6A OUTPUT FROM COMPARATOR 11
FIG. 6B OUTPUT FROM DELAY CIRCUIT 12
FIG. 6C OUTPUT FROM DRIVER 13

OUTPUT FROM
COMPARATOR 11

OUTPUT FROM
DELAY
CIRCUIT 21

OUTPUT FROM
DRIVER 13

DETECTION
LEVEL

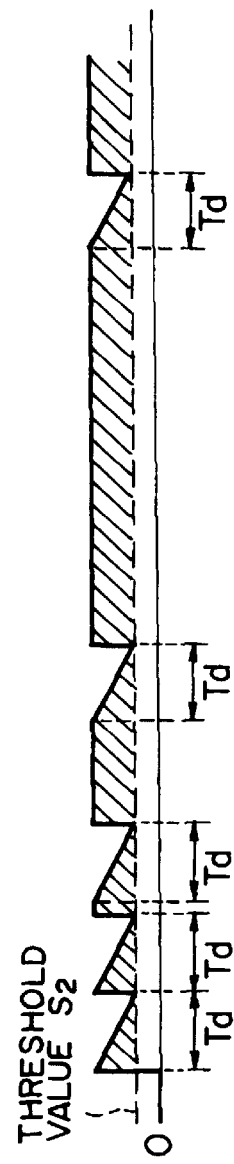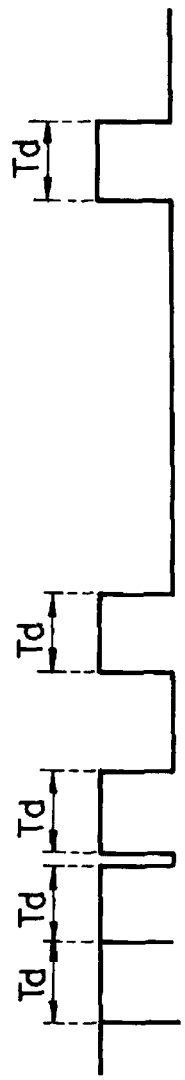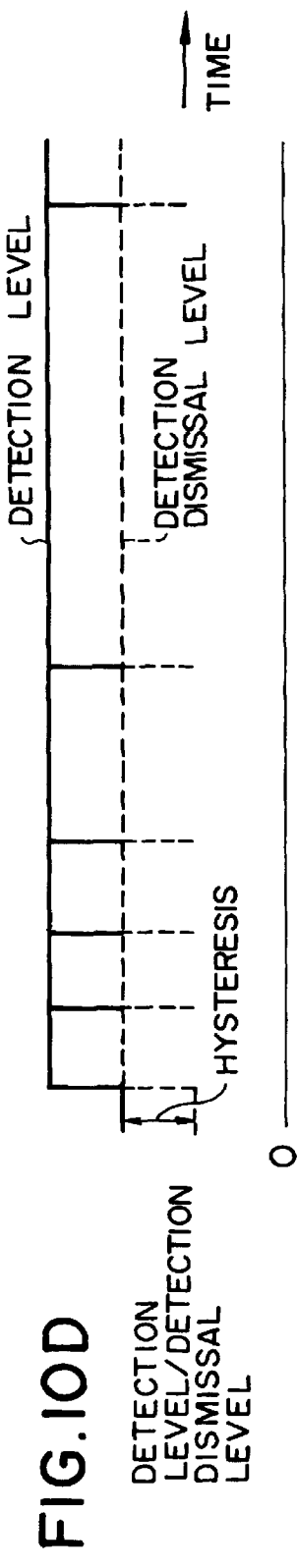
FIG. 10A  OUTPUT FROM COMPARATOR 31
FIG. 10B  OUTPUT FROM DELAY CIRCUIT 32
FIG. 10C  OUTPUT FROM DRIVER 13
FIG. 10D  DETECTION LEVEL/DETECTION DISMISSAL LEVEL

CHARGER TERMINAL VOLTAGE

MOVING AVERAGE

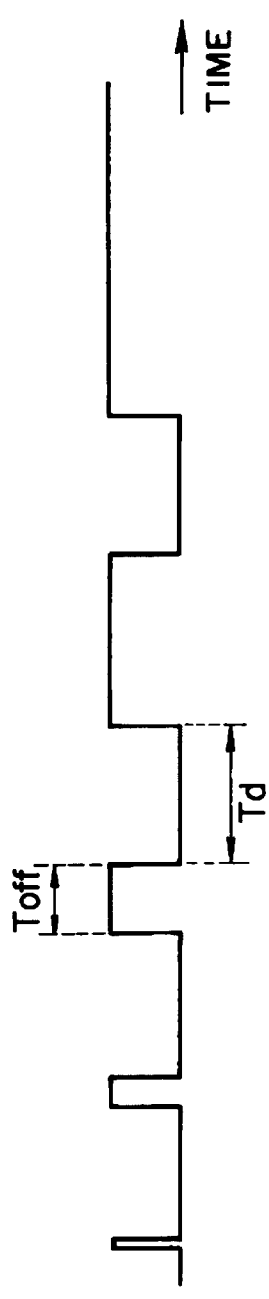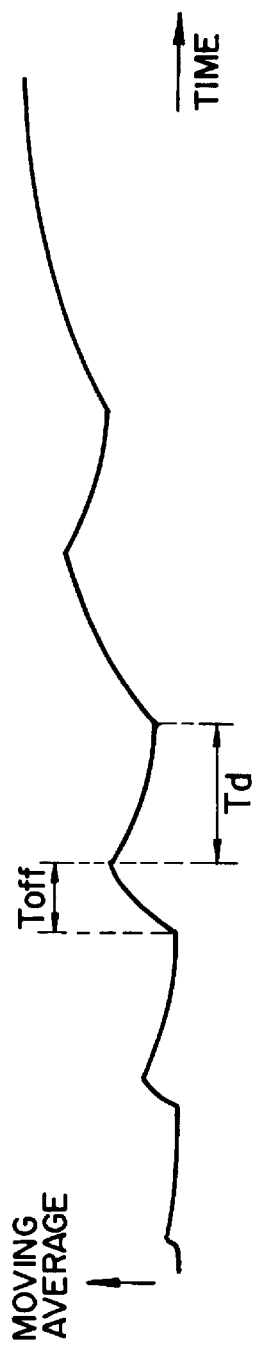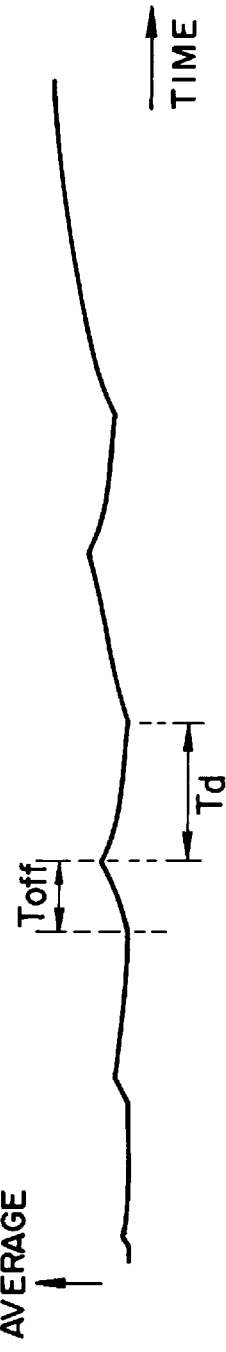

CHARGER TERMINAL VOLTAGE

MOVING AVERAGE

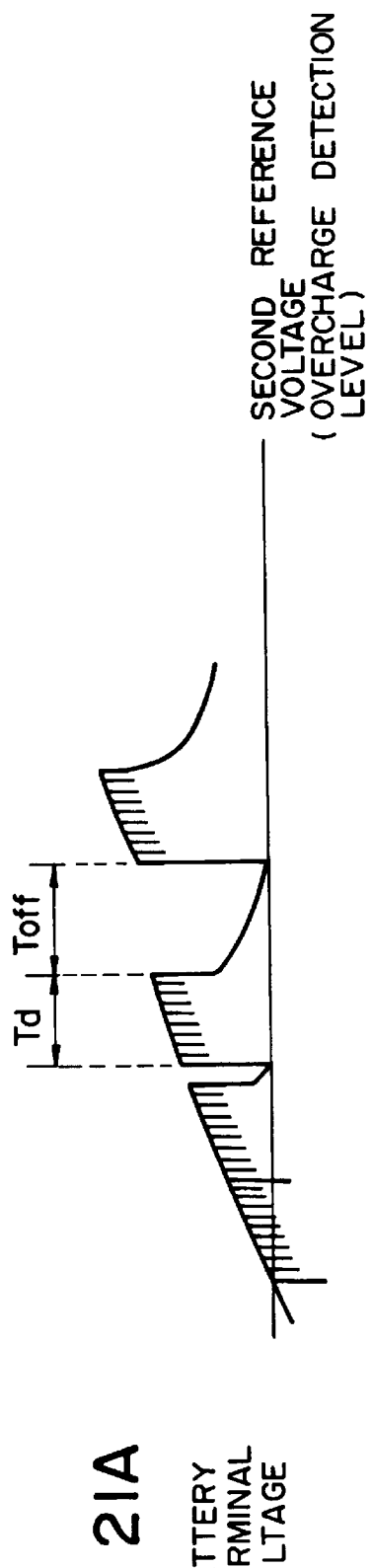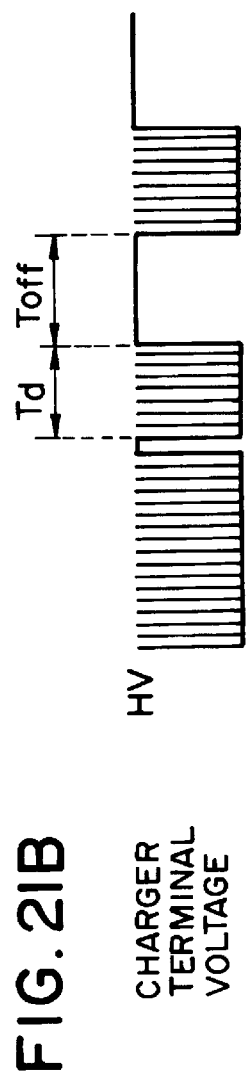
FIG. 21A BATTERY TERMINAL VOLTAGE
FIG. 21B CHARGER TERMINAL VOLTAGE

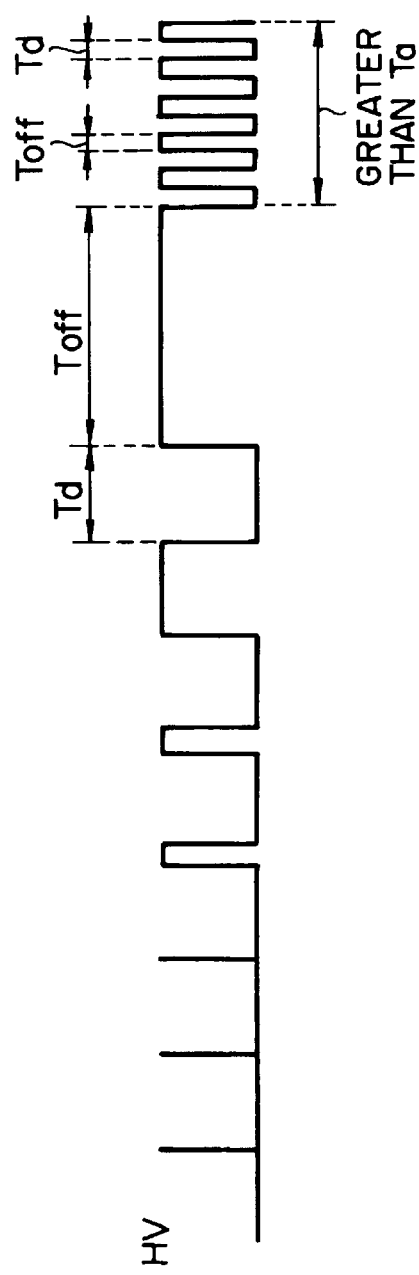
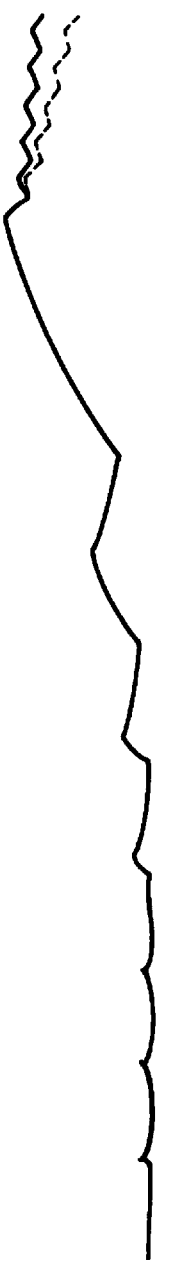
FIG. 25A CHARGER TERMINAL VOLTAGE
FIG. 25B MOVING AVERAGE

CHARGING CONTROL APPARATUS USING VARIABLE INTERMITTENT CURRENT CHARGING

BACKGROUND OF THE INVENTION

1. Field of the Invention

The present invention broadly relates to a battery charging control apparatus and, more particularly, to a charging control apparatus suitable for use in the control of charging of, for example, a battery pack containing a secondary battery which does not exhibit voltage drop generally referred to as $-\Delta V$.

2. Description of the Related Art

In general, there are two types of secondary battery: namely, non-aqueous batteries represented by lithium ion battery and aqueous batteries such as NiCd batteries, NiMH batteries and lead batteries. Unlike aqueous batteries, non-aqueous batteries do not exhibit any inflection point of the battery voltage at the end of the charging. For this reason, different charging methods are used for non-aqueous and aqueous batteries.

More specifically, charging of non-aqueous batteries is conducted by monitoring charging current while maintaining charging voltage constant and terminating the supply of the charging current when the current has become sufficiently small. A typical example of this charging method is "constant-current constant-voltage" method used for lithium ion batteries. In contrast, charging of aqueous batteries terminates when the above-mentioned inflection point is detected. A charging method known as the $-\Delta V$ method, used for NiCd batteries and NiMH batteries, is a typical example of such charging methods used for aqueous batteries.

Non-aqueous batteries do not have electrochemical self-protecting function which is exhibited by aqueous batteries. In general, therefore, battery packs incorporating non-aqueous batteries are provided with electric circuits for protection against overcharging. A typical overcharge protection circuit is composed mainly of a detection block which detects the battery voltage and a switching block which performs switching between on and off states of the charging current in relation to the battery voltage. The switching block has a switching element. In a known charging system, the switching block is connected in series to the battery so that it can open the charging current circuit to cut-off the charging current as required. In another known charging system, the switching element is connected in parallel to the batteries so as to selectively bypass the charging current to perform a control of the charging current including turning on and off of the same, thereby controlling the battery voltage to a set level.

As will be seen from the foregoing description, non-aqueous batteries and aqueous batteries employ different types of charging method and, hence, different type of chargers or system. It will be convenient if an aqueous battery charger usable also for non-aqueous batteries is available.

However, since aqueous battery chargers are designed to terminate the charging upon detection of $-\Delta V$, it has been impossible to safely and satisfactorily charge non-aqueous batteries by using this type of charger.

SUMMARY OF THE INVENTION

Accordingly, it is an object of the present invention to provide a battery charging control apparatus which enables safe and satisfactory charging of non-aqueous batteries by using an aqueous battery charger.

To this end, according to the present invention, there is provided a battery charging control apparatus for controlling charging of a secondary battery, comprising: controlling means for performing control of an intermittent charging in such a manner that, when the voltage of the secondary battery which is being charged has risen to a level not lower than a predetermined reference level, the supply of the charging current is suspended after being forcibly supplied to the secondary battery for a predetermined forced charging time and, when the voltage of the secondary battery has come down to the reference voltage after the suspension of the supply of the charging current, the charging current is supplied again to the secondary battery, the suspension of supply of the charging current and the forced supply of the charging current being alternately and repeatedly performed; and switching means controlled by the controlling means so as to turn on and off the charging current; wherein the controlling means being arranged to vary the forced charging time in accordance with the progress of the charging of the secondary battery. The controlling means, for example, comprises components shown in FIG. 20 including a voltage source 11A, comparator 31, inverter 41, transistor 42, buffer 43, FET 44, driver 45, resistors R1 to R5, capacitor C1, diode D, and so forth. The switching means comprises, for example, a FET 4 shown in FIG. 20.

The controlling means may be arranged so as to progressively prolongs the forced charging time in accordance with the progress of the charging of the secondary battery.

The battery charging control apparatus may further comprise judging means which measures the length of voltage reduction time required for the voltage of the secondary battery to be reduced to the predetermined reference voltage during the suspension of supply of the charging current and determines whether the voltage reduction time is not shorter than a predetermined reference time. The judging means, for example, comprises a Toff detecting circuit 55 as shown in FIG. 26. When such judging means is incorporated, the arrangement may be such that the controlling means controls the switching means in such a manner that the forced charging time after the voltage reduction time has become not shorter than the reference time is longer than the forced charging time employed when the voltage reduction time is still shorter than the reference time.

When the above-described judging means is incorporated, the arrangement also may be such that the controlling means controls the switching means in such a manner that the forced charging time after the voltage reduction time has become not shorter than the reference time is shorter than the forced charging time employed when the voltage reduction time is still shorter than the reference time.

In the battery charging control apparatus of the invention, the controlling means may be arranged to control the switching means in two phases including a first phase in which the forced charging time is progressively shortened and a subsequent second phase which includes repeating turning on and off of the switching means at a predetermined period of repetition with a constant off time length.

The controlling means also may be arranged such as to keep the switching means off for a predetermined period after suspension of supply of the charging current, regardless of the voltage of the secondary battery, or to turn the switching means on and off at a high switching frequency during the forced charging time.

In the operation of the charging control apparatus of the invention having the described features, the charging is intermittently conducted in such a manner that, when the voltage of a secondary battery which is being charged has risen to a level not lower than a predetermined reference voltage, charging current is forcibly supplied to the secondary battery for a predetermined time and then terminated and, when the battery drop has come down to the reference voltage, charging current is again supplied forcibly for a predetermined time. The switching means, particularly the FET 24 shown in FIG. 20, is so controlled as to vary the time length of the forcible supply of the charging current, in accordance with the progress of the charging. When a battery device, e.g., a battery pack, having this control apparatus is charged by an aqueous battery charger, a quasi-voltage drop $-\Delta V$ is detected by the charger when the charging has proceeded to a satisfactory level. It is thus possible to safely and sufficiently charge non-aqueous batteries by using an aqueous battery charger.

BRIEF DESCRIPTION OF THE DRAWINGS

FIGS. 3A and 3C are illustrations of a first intermittent charging method;

FIGS. 4A to 4C are illustrations of a second intermittent charging method;

FIG. 5 is an illustration of the construction of a battery pack to be charged in accordance with the first charging method;

FIGS. 6A to 6C are illustrations of the operation of the battery pack shown in FIG. 5;

FIGS. 10A to 10D are illustrations of the operation of the battery pack shown in FIG. 9;

FIGS. 15A to 15C are illustrations of moving average values obtained for different averaging widths;

FIGS. 21A and 21B are waveform charts showing secondary battery terminal voltage and charger terminal voltage, as observed when a battery pack shown in FIG. 22 is charged;

FIGS. 25A and 25B are illustrations of a second principle of the present invention;

DESCRIPTION OF THE PREFERRED EMBODIMENTS

The invention will be described in detail hereinunder through illustration of preferred embodiments with reference to the accompanying drawings. In order to facilitate understanding of the present invention, a brief description will be given of the technology to which the invention pertains, prior to the description of the embodiments.

Figure 1:
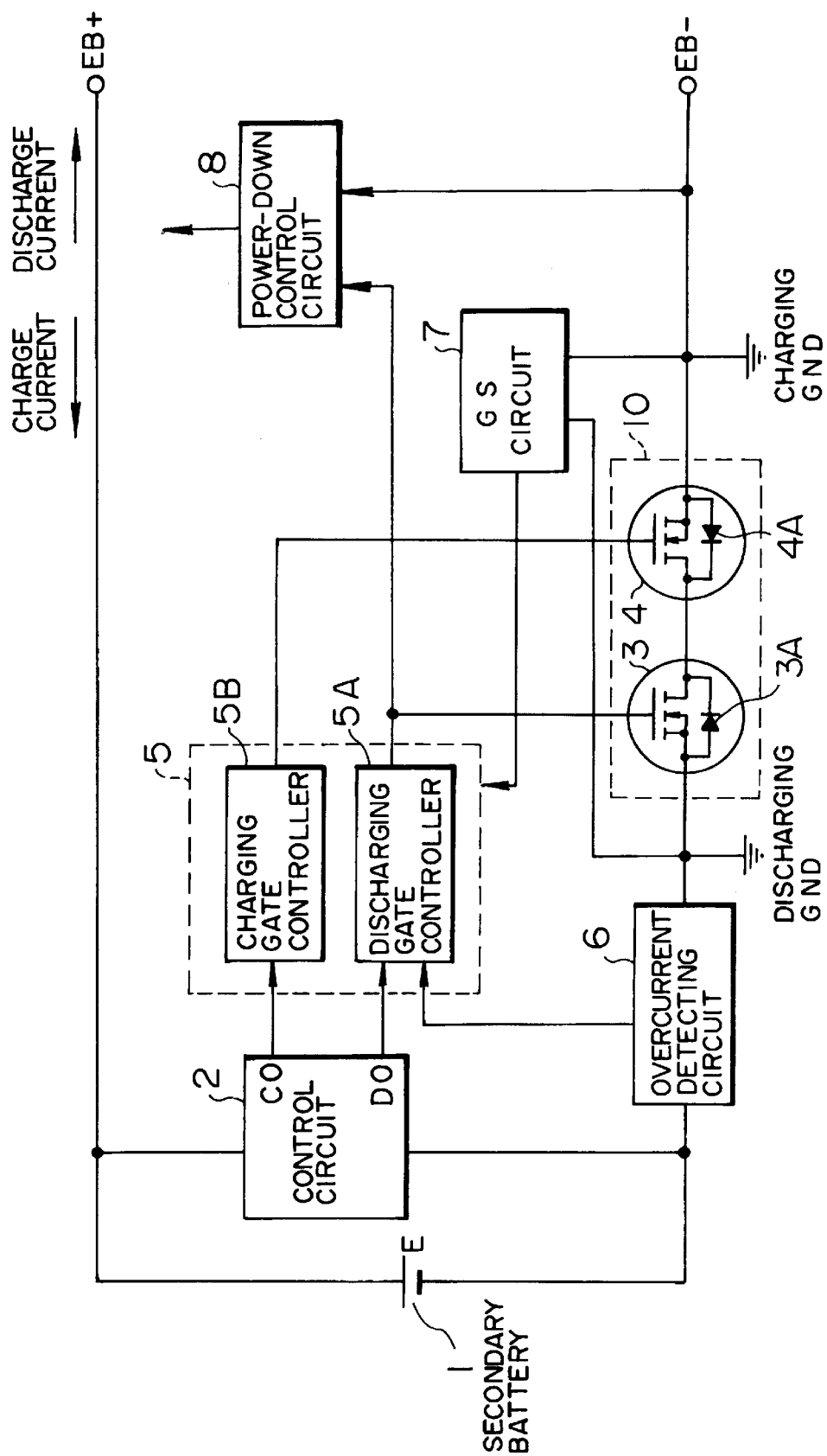
FIG. 1 is a block diagram illustrative of the construction of a battery pack to which the present invention is applied.

Referring to FIG. 1, a battery pack to which the present invention is to be applied has a secondary battery 1 which may be a lithium ion battery. The secondary battery 1 has a + (plus) terminal connected to a battery pack terminal EB+ and a – (minus) terminal connected to a battery pack terminal EB– via an overcurrent detecting circuit 6 and a switching circuit 10 which comprises FETs 3 and 4.

A control circuit 2 is connected between the plus and minus terminals of the secondary battery 2 so as to detect the voltage between these terminals, i.e., the battery voltage of the secondary battery 1. The control circuit 2 has terminals DO and CO which are respectively connected to gates G of the FET 3 which is an N-channel MOSFET and the FET 4 which also is an N-channel MOSFET, through a gate controller 5. The gate controller 5 has a discharging gate controller 5A and a charging gate controller 5B. The discharging gate controller 5A and the charging gate controller 5B apply the signals from the terminals DO and CO of the control circuit 2 to the gates G of the FETs 3 and 4, respectively, with a ground shift as necessary.

The FET 3 has the source S which is connected through the overcurrent detecting circuit 6 to the control circuit 2 and also to the minus terminal of the secondary battery 1, and the drain D which is connected to the drain of the FET 4. The source of the FET 4 is connected to the terminal EB−.

The FET 3 has a parasitic diode 3A formed between the source and drain thereof. The parasitic diode 3A allows charging current to flow to the secondary battery 1 but prevents discharge current from the secondary battery 1 from flowing therethrough. The FET 4 has a parasitic diode 4A formed between the source and drain thereof. The parasitic diode 4A allows discharge current to flow from the secondary battery 1 but prevents charging current to the secondary battery 1 from flowing therethrough.

Under a normal condition in which the voltage of the secondary battery 1 which is being detected falls within a predetermined range, the control circuit 2 delivers either L or H level signals, e.g., H level signals, from its terminals DO and CO. These H level signals are boosted by the gate controller 5, i.e., the discharging gate controller 5A and the charging gate controller 5B, to levels (H levels) high enough to turn the FETs 3 and 4 ON. The H level signals thus obtained are applied to the gates of the FETs 3 and 4. As a result, the FETs 3 and 4 are normally held in conductive state.

Therefore, when a load (not shown) is connected between the terminals EB+ and EB−, discharge current flows from the secondary battery 1, via the terminal EB+, load, terminal EB−, the source and drain of the FET 4, the drain and the source of the FET 4, and the overcurrent detecting circuit 6.

During the discharging, the control circuit 2 monitors the battery voltage and, when the battery voltage has come down below a predetermined first reference voltage, i.e., when there is a risk of over-discharge from the secondary battery 1, the control circuit turns the output level from H to L level (ground level) at its terminal DO. As a result, an L level signal is applied to the gate of the FET 3, thereby turning off the same.

Since the parasitic diode 3A of the FET 3 allows only the charging current to flow therethrough while blocking the discharge current, the discharge current is interrupted as a result of turning off of the FET 3, thereby avoiding over-discharge.

It is assumed here that a charger (not shown) is connected between the terminals EB+ and EB− under the condition stated above and starts to charge the secondary battery 1. Charging current flows from the charger via the terminal EB+, secondary battery 1, overcurrent detecting circuit 6, parasitic diode 3A and the FET 4. It is to be noted that a voltage drop is caused across the parasitic diode 3A, which is about 0.6 to 0.8 V greater than that observed between the source and drain of the FET 3 when the latter is conductive. Namely, when a voltage higher than a certain level is applied to the gate of the FET 3, the voltage drop across the FET 3, i.e., between the source and the drain, is very small. This applies also to the case of the FET 4. Due to this comparatively large voltage drop across the parasitic diode 3A, the charging through the parasitic diode 3A cannot be conducted with high efficiency.

Therefore, when the charging is commenced by the connection of the charger, the control circuit 2 detects, for example, the voltage drop across the charger (this voltage drop is on the order between 0.1 and 0.4 V or so) and forcibly switches the output level at the terminal DO from L to H. As a consequence, an H level signal is applied to the gate of the FET 3 to turn on the same, so that charging is performed through the terminal EB+, secondary battery 2, overcurrent detecting circuit 6, FET 3 and the FET 4.

The battery voltage is being monitored by the control circuit 6 also during the charging. When the monitored voltage has risen to exceed a predetermined second reference voltage which causes a risk of over-charging of the secondary battery 1, the control circuit 2 turns the output level from H to L (ground level) at its terminal CO, so that an L level signal is applied to the gate of the FET 4. Since the parasitic diode 4A of the FET 4 is formed such as to allow only the discharge current to flow therethrough, i.e., to block charging current, the charging current is interrupted as a result of the turning off of the FET 4, thereby avoiding over-charging of the secondary battery 1.

When the load is again connected between the terminals EB+ and EB−, the secondary battery 2 is allowed to discharge so that discharge current flows from the secondary battery 1 via the terminal EB+, load, parasitic diode 4A, FET 3 and the overcurrent detecting circuit 6. This discharge, however, cannot be performed with high efficiency, because the parasitic diode 4A causes a considerable voltage drop as is the case of the parasitic diode 3A.

Therefore, when the discharge is commenced as a result of connection of the load, the control circuit 2 detects, for example, the voltage drop across the load (this drop is on the order between 0.1 and 0.4 V or so), and forcibly turns the output level from L to H at its terminal CO so as to turn on the FET 4, thereby enabling efficient charging.

Thus, the FET 3 and the FET 4 serve as means for preventing over-discharge and means for preventing over-charge of the secondary battery 1.

The overcurrent detecting circuit 6 detects the level of the electrical current flowing therethrough and delivers an L level signals to the discharging gate controller 5A when the current exceeds a predetermined value. Therefore, the FET 3 is turned off when an excessively large current is detected by the overcurrent detecting circuit 6, so as to cut off the discharge current. The overcurrent detecting circuit 6 may be constructed such that it delivers the L level signal not only to the discharging gate controller 5A but also to the charging gate controller 5B upon detection of the excessively large current. Such a construction of the overcurrent detecting circuit makes it possible to cut off both the charging and discharging currents, since both the FETs 3 and 4 are turned off whenever an excessively large current is detected.

A power-down control circuit 8 is designed to receive the output from the discharging gate controller 5A and, upon receipt of an L level signal, i.e., when the battery pack is in over-discharge state (or when overcurrent is detected), switches the operation modes of the control circuit 2, gate controller 5 and other components to power-down modes which consume less electrical power, thereby realizing prolonged shelving time of the secondary battery 1. When the charger is connected between the terminals EB+ and EB−, the power-down control circuit 8 detects a change on the voltage caused at the terminal EB− as a result of the connection of the charger, and recovers the ordinary operation modes of the control circuit 2, gate controller 5 and so on.

In the battery pack as shown in FIG. 1, the switching circuit 10 is provided on the ground side of the battery pack, so that the ground levels as indicated by discharging GND and charging GND apply during the discharging and charging, respectively.

The construction of the switching circuit 10 shown in FIG. 1 is only illustrative. Namely, the switching circuit 10 may have a construction shown in FIG. 2A or a construction shown in FIG. 2B. More specifically, in the switching circuit 10 shown in FIG. 2A, the gates of the FET3 and FET 4 commonly receive the logical sum (OR) of the outputs from the discharging gate controller 5A and the charging gate controller 5B. Therefore, both the FET3 and the FET 4 are turned off in either case of over-discharging (overcurrent) and over-charging.

Figure 2A:
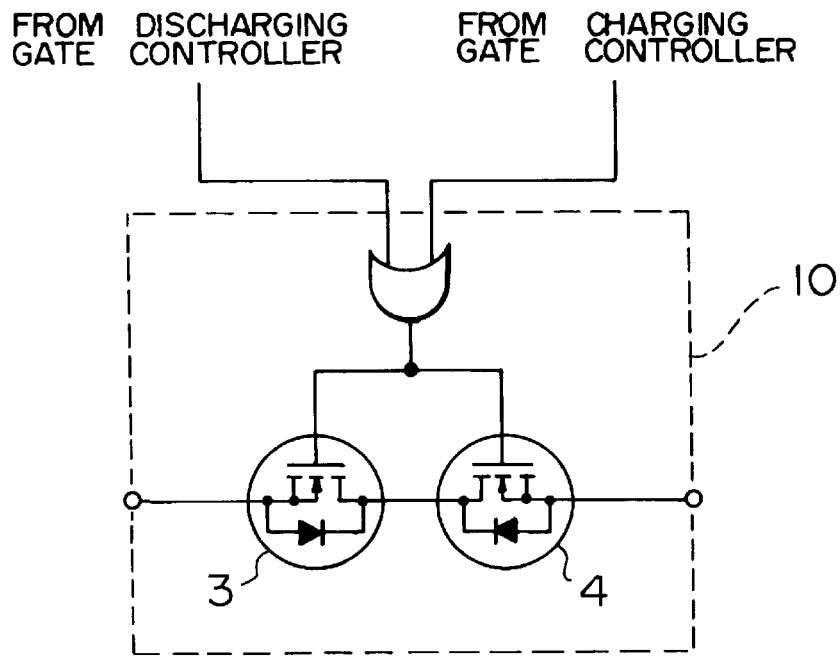
FIGS. 2A and 2B are illustrations of examples of a switching circuit incorporated in the battery pack shown in FIG. 1.

When this switching circuit 10 is used, however, it is necessary that the ground levels of the signals applied to the gates of the FETs 3 and 4 during discharging and charging have to be set to the levels indicated by discharging GND and charging GND, respectively. It is therefore necessary to use a ground select (GS) circuit 7 as shown in FIG. 1, when the switching circuit 10 of the type shown in FIG. 2A is used. The GS circuit selects the discharging GND or the charging GND so that the selected GND is used as the ground for the gate controller 5 depending on whether the mode is the discharging or charging mode. The gate controller 5 is adapted to shift the ground level of its output to the level of one of the discharging GND and charging GND selected by the GS circuit 7, so as to ensure that the FET 3 or the FET 4 is safely turned off.

For instance, the GS circuit is designed to incorporate a comparator which compares the discharging GND level and the charging GND level with each other so as to select the lower one of these two levels. Alternatively, the GS circuit 7 may be arranged such as to select the discharging GND or the charging GND, depending on whether the L level signal is being to be delivered by the discharging gate controller 5A or by the charging gate controller 5B, i.e., whether the present state is over-discharge (overcurrent) or overcharge.

Figure 2B:
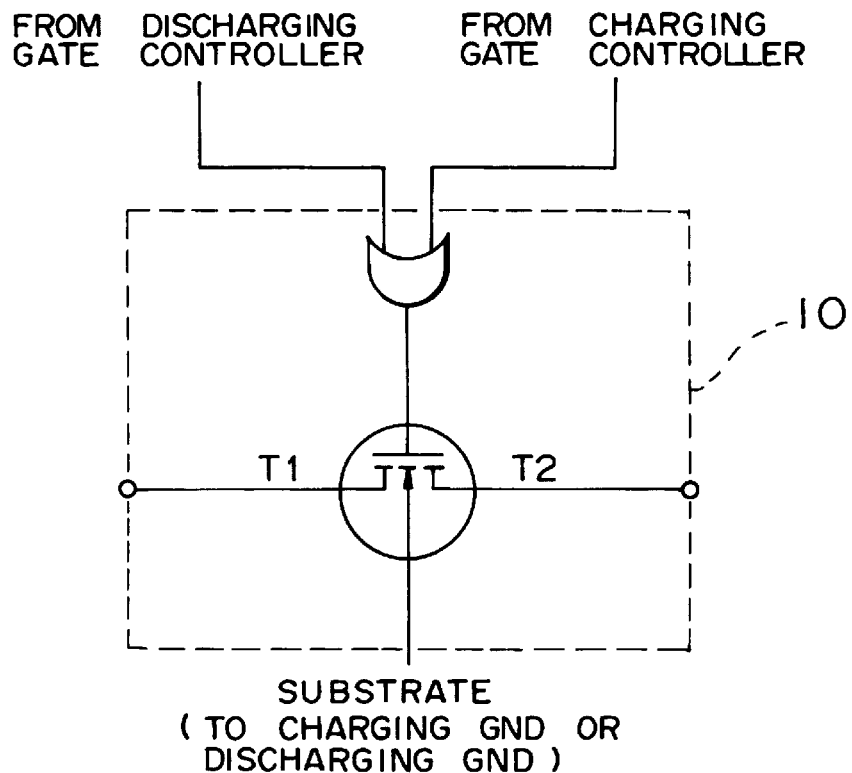

FIG. 2B shows still another construction of the switching circuit 10 which uses a bilateral FET having no internal parasitic diode and adapted to receive the logical sum (OR) of the outputs of both gate controllers 5A, 5B at its gate.

The bilateral FET is constructed such that a parasitic diode similar to the parasitic diode 3A or 4A of the FET 3 or 4 is formed in this bilateral FET when the substrate of the bilateral FET is connected to the terminal T1 or T2 thereof. It is therefore possible to realize the function to prevent over-discharge and overcharge as explained in connection with FIG. 1, by arranging such that the substrate is connected to the terminal T1 and T2 during discharging and charging, respectively.

It is to be noted, however, that the ground level of the signal applied to the gate of the bilateral FET is set to the levels of the discharging GND and charging GND, respectively, during discharging and charging. It is therefore necessary to employ a GS circuit 7 when the switching circuit 10 of the type shown in FIG. 2B is used. In order that the substrate is connected to the terminal T1 and the terminal T2 during the discharging and during the charging, respectively, therefore, it suffices to connect the substrate to the output terminal of the GS circuit 7, i.e., to the junction where the gate controller 5 and the GS circuit 7 are connected to each other.

The battery pack of the type described, having a secondary battery 1 such as of lithium ion battery, does not have function to detect the so-called −ΔV. Hitherto, therefore, a charging method has been used in which a secondary battery is charged with a constant charging current until the voltage of the secondary battery becomes equal to the full-charge voltage and, thereafter, charging is continued with a constant voltage so that the charging current is progressively reduced without causing the battery voltage to exceed the full-charge voltage. The charging is terminated when the charging current has been reduced to a level below a predetermined level.

Actually, however, a secondary battery is composed of ideal internal cells and internal resistance, so that the battery voltage is lowered by an amount corresponding to the drop across the internal resistance, i.e., by an amount which is the product of the internal resistance and current. This loss will be referred to as "IR loss". Furthermore, the voltage of the secondary battery progressively gets lower due to polarization of the electrodes. This voltage loss caused by polarization will be referred to as "IRP loss".

A method therefore has been used in which the period of charging with constant voltage is extended so that the voltage battery after subtraction of the IR loss and the IRP loss finally equals to the full-charge voltage.

This method undesirably prolongs the charging time.

In view of this problem, it has been currently proposed to adopt intermittent charging method for battery packs.

A typical intermittent charging method will be described with reference to FIGS. 3A to 4C.

FIGS. 3A to 3C show, respectively, the levels of the battery voltage (voltage E between terminals of the secondary battery 1), charging current and the charger terminal voltage (voltage between the terminals of the charger).

According to a first intermittent charging method, the charging current is cut off after elapse of a predetermined time Td from the moment at which the aforementioned second reference voltage is reached as a result of the supply of the charging current. This second reference voltage, which causes a risk of overcharge of the secondary battery 1, will be referred to also as an "over-charging detection level". While the supply of the charging current is suspended, the battery voltage becomes lower to the overcharge detection level due to the aforesaid internal resistance and polarization. The supply of charging current is commenced without delay after the detection of the battery voltage having come down to the overcharge detection level. This operation is repeated until the battery is satisfactorily charged.

More specifically, the supply of a constant charging current as shown in FIG. 3B causes the battery voltage E to rise to the overcharge detection level and further to a higher level as shown in FIG. 3A. The charging current is cut off after elapse of the predetermined time Td from the moment at which the overcharge detection voltage is reached. In this case, the battery voltage is instantaneously lowered to a level below the overcharge detection level, due to the voltage drop across the internal resistance, so that the supply of the charging current is commenced without delay.

In this case, the voltage drop in the battery is caused almost fully by the internal resistance, so that the battery voltage attained before the cutting off of the charging current is recovered immediately after the re-start of supply of the charging current, i.e., back to the level exceeding the overcharge detection level. The charging current is then cut off again after elapse of the predetermined time Td.

As a result of repetition of the described operation, the accumulation of energy in the secondary battery 1, as the time-integration of the charging current, i.e., the charging, proceeds to a satisfactory level. Consequently, the voltage of the battery which is being charged rises to such a level that the difference between the battery voltage and the overcharge detection level exceeds the amount of the voltage drop caused by the internal resistance. In such a state, the battery voltage does not instantaneously decreases to the level below the overcharge detection level, despite the cutting off of the charging current. Namely, the battery voltage gently decreases to the level below the overcharge detection level, due to the voltage drop caused by the effect of polarization which appears progressively after the cutting off of the charging current. That is to say, the length of the interval between successive cycles of charge current supply, i.e., the period of suspension of the current supply, becomes longer when the degree of charging of the secondary battery approaches final charge-up state.

It is thus possible to satisfactorily charge the secondary voltage 1 by continuing the repetition of intermittent current supply until the time length of suspension of the charge current, measured by a timer for example, becomes longer than a certain value.

FIGS. 4A to 4C show the levels of the battery voltage (voltage E between the terminals of the secondary battery 1), charging current and the voltage between the charger terminals as observed when the charging is conducted in accordance with a second intermittent charging method.

According to the second intermittent charging method, the charging current is cut off immediately when the overcharge detection level is reached by the battery voltage as a result of the supply of the charging current. The supply of the charging current is re-started immediately after the reduction of the battery voltage to a level not higher than the overcharge detection level as a result of the voltage drop due to the internal resistance and polarization. The supply of the charging current is continued for a predetermined time Td regardless of the level of the battery voltage.

More specifically, the secondary battery 1 is charged with a constant charging current as shown in FIG. 4B so that the battery voltage is raised as shown in FIG. 4A and, when the overcharge detection level is reached, the charging voltage is cut off without delay. In this case, the battery voltage instantaneously comes down below the overcharge detection level, so that the supply of the charging current is commenced immediately after the cut off of the charging current. Consequently, the battery voltage which was reached before the cutting off of the charging current is recovered instantaneously, as a result of the re-start of the supply of the charging current.

Consequently, the battery voltage instantaneously exceeds the overcharge detection level as a result of the re-start of the supply of the charging current. In this case, the re-start of the supply of the charging current is triggered by the reduction of the battery voltage to the level below the overcharge detection level during the suspension of the supply of the charging current. Therefore, the supply of the charging current is continued until the predetermined time Td elapses, regardless of the battery voltage.

The battery voltage therefore rises to the overcharge detection level and further to a higher level and, when the time Td has elapsed, the charging current is cut off again immediately, since the overcharge detection level has been exceeded. As a result of repetition of the above-described operation, the secondary battery is charged to a higher degree, so that the length of time required for the battery voltage to come down below the overcharge detection level is prolonged as in the case of the first intermittent charging method described before. The period of suspension of the supply of the charging current therefore becomes longer.

Thus, the second intermittent charging method also enables satisfactory charging of the battery by terminating the repetition of supply of the charging current, when the length of time of suspension of the current supply, detected by a timer for example, has become greater than a predetermined time length.

The voltage between the terminals of the charger, which is an aqueous battery charger applied to charging of non-aqueous battery, varies depending on whether the charging current is being supplied or not, regardless of whether the first intermittent charging method or the second intermittent charging method is used. Namely, when there is no charging current, a high voltage (open voltage HV) appears between the terminals of the charger, whereas, when the charging current exists, the voltage between the terminals of the charger is equal to the voltage between the terminals of the battery pack which is substantially equal to the battery voltage, as shown in FIG. 3C or FIG. 4C.

Figure 7:
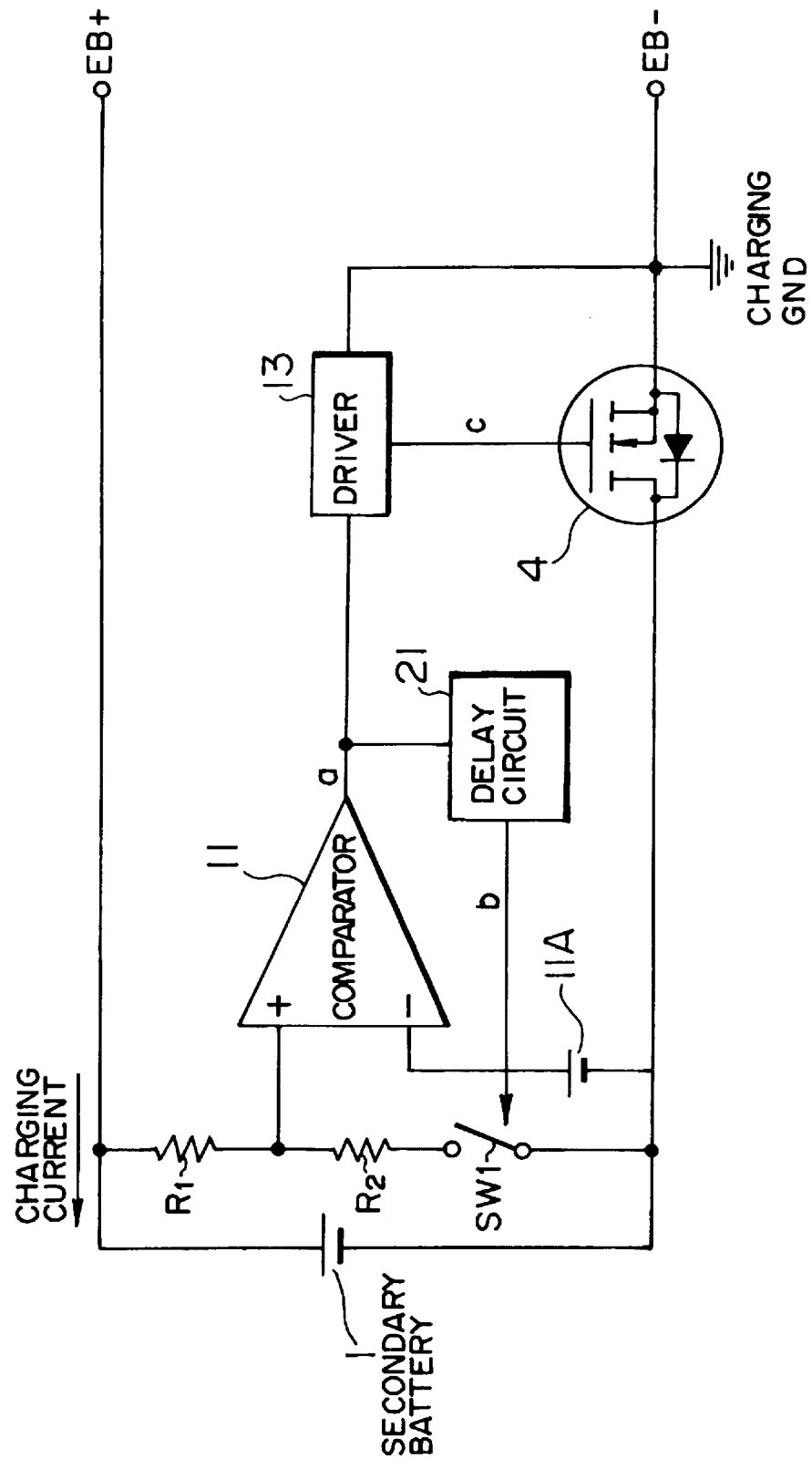
FIG. 7 is an illustration of the construction of a battery pack to be charged in accordance with the second charging method.
Figure 8A:
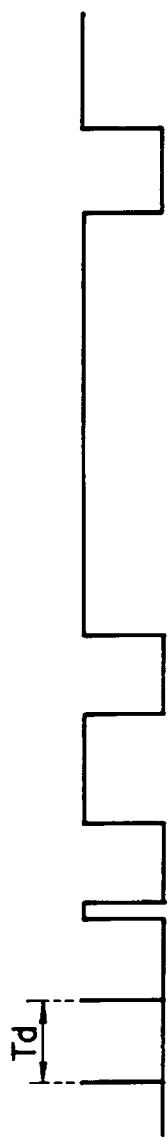
FIGS. 8A to 8D are illustrations of the operation of the battery pack shown in FIG. 7.
Figure 8B:
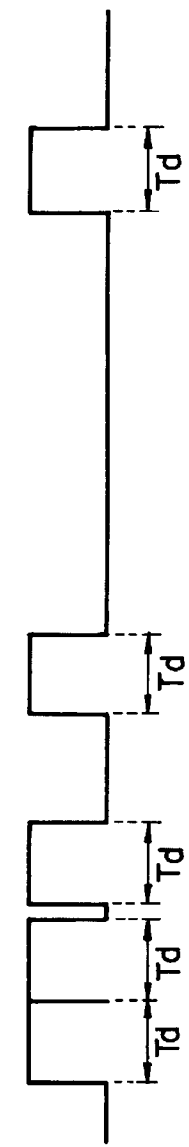

A description will now be given of applications of the above-described intermittent charging methods to the battery pack of the type shown in FIG. 1, with specific reference to FIGS. 5 to 10D. In FIGS. 5, 7 and 9, parts or components corresponding to those shown in FIG. 1 are denoted by the same reference numerals as those used in FIG. 1. These Figures also omit those blocks which are shown in FIG. 1 but do not directly take part in the charging operation.

FIG. 5 shows an example of a battery pack which is charged in accordance with the first intermittent charging method. A comparator 11 has a non-inversion input terminal (+ terminal) connected to the point of junction between the plus terminal of the secondary battery 1 and the EB+ terminal of the battery pack, and an inversion terminal (- terminal) connected through a reference voltage power supply 11A to a junction between the minus terminal of the secondary battery 1 and the terminal EB- of the battery pack. The reference voltage power supply 11A has a plus terminal which is connected to the comparator 11 and a minus terminal connected to the minus terminal of the secondary battery 1, so that the reference voltage power supply 11A applies to the minus terminal of the comparator 11 with a voltage which is equal to the overcharge detection level.

The comparator 11 is so constructed as to produce an output signal of H level when the voltage applied to the non-inversion input terminal is equal to or higher than the voltage (overcharge detection level) applied to the inversion terminal thereof. Thus, when the voltage received at the non-inversion terminal is below the voltage (over-charge detection level) received at the inversion input terminal, the comparator 11 produces an output of L level.

The comparator 11 and the reference voltage power supply 1A in combination provide a control circuit which corresponds to the control circuit 2 shown in FIG. 1.

A delay circuit 12 delivers the output of the comparator 11 to the driver 13 after delaying the output by the time length Td. The driver 13 is arranged to turn the FET 4 on and off so as to allow the charging current between the drain and the source to flow and to interrupt the same, in response to the output delivered by the delay circuit 12. The delay circuit 12 and the driver 13 in combination provide a circuit which corresponds to the charging gate controller 5b shown in FIG. 1. The driver 13 is arranged to shift the ground level of its output signal to the charging GND level so that the FET 4 is turned off without fail.

A description will now be given of the operation of this charging apparatus with reference to FIGS. 6A to 6C. The charger (not shown) is connected between the terminals EB+ and EB− so that a charging current is supplied therefrom to the secondary battery 1 thereby commencing the charging. As a result, the battery voltage is raised as shown in FIG. 3A and, when the battery voltage reaches the reference level, i.e., the overcharge detection level, applied to the minus terminal of the comparator 11, the output of the comparator 11 is switched from L to H level as shown in FIG. 6A.

The delay circuit 12 has a so-called CR circuit composed of a resistor and a capacitor. When a signal of H level is applied to the delay circuit 12, the level of the output from the delay circuit 12 progressively rises with a certain time constant and, when the predetermined time Td has elapsed, the output level reaches a threshold level $S_1$, as shown in FIG. 6B. The output of the CR circuit switched to L level immediately after the output from the comparator 11 changes to L level.

The delay circuit 12 produces a signal of H level when the level of the output from the CR circuit enters the region not lower than the threshold level $S_1$. This region is hatched in FIG. 6B. Therefore, when the predetermined time Td has passed from the start of supply of the H level output from the comparator 11, the delay circuit 12 delivers a signal of H level to the driver 13. The delay circuit 12 delivers a signal of L level when the output from the CR circuit is below the threshold level $S_1$.

As shown in FIG. 6C, the driver 13 supplies the gate of the FET 4 with a signal which is of H level when the output of the delay circuit 12 is L and which is of L level when the output of the delay circuit 12 is H, respectively, thereby turning on and off the FET 4. In the instant state, therefore, the FET 4 is turned off.

As a result, the battery voltage rises as shown in FIG. 3A and, after elapse of the predetermined time Td from the moment when this voltage reaches the overcharge detection level, the FET 4 is turned off, whereby the charging current is turned off.

In this case, as described before, the battery voltage instantaneously comes down to the overcharge detection level which is applied by the reference voltage power supply 11A to the minus terminal of the comparator 11, due to the internal resistance of the battery.

As a result, the level of the output from the comparator 11 is changed from H to L as shown in FIG. 6A, whereby the output from the delay circuit 12 is changed from H to L as shown in FIG. 6B. The level of the output from the driver 13 is therefore switched from L to H as shown in FIG. 6C, whereby the FET 4 is turned on, thus re-starting the supply of the charging current to the secondary battery 1 without delay as explained before in connection with FIG. 3B.

In this case, as stated before, the drop of the battery voltage is almost fully caused by the internal resistance, so that the battery voltage achieved before the turning off of the charging current is recovered immediately after the re-start of supply of the charging current, as will be seen from FIG. 3A.

Thus, the battery voltage grows to exceed the reference voltage given by the reference voltage power supply 11A, i.e., the overcharge detection level, immediately after the re-start of supply of the charging current, so that the output of the comparator 11 is switched from L to H level without delay as shown in FIG. 6A. Then, after elapse of the predetermined time Td, the output from the delay circuit 12 is switched from L to H level as shown in FIG. 6B. When the output from the delay circuit 12 is switched to H level, the output of the driver 13 is changed to L level as shown in FIG. 6C, whereby the FET 4 is turned off. Therefore, the charging current is interrupted again after elapse of the time Td from the re-start of the supply of the same.

The above-described operation is repeated so that charging of the secondary battery 1 proceeds. Consequently, the time required for the battery voltage to decrease to the level equal to or below the overcharge detection level becomes longer.

As a consequence, the durations of the H level outputs from the comparator 11 (see FIG. 6A) and the output from the delay circuit 12 (see FIG. 6B) become longer, as well as the duration of the L level of the output sinal from the driver 13 (see FIG. 6C). The interval of the supply of the charging current, i.e., the period of suspension of the supply of the charging current, is prolonged correspondingly, as will be seen from FIG. 3B.

FIG. 7 illustrates a battery pack adapted to be charged in accordance with the second intermittent charging method described before. In this Figure, components or blocks corresponding to those in FIG. 5 are denoted by the same reference numerals as those used to depict the corresponding components or blocks in FIG. 5.

This battery pack is so arranged that the output from the comparator 11 is directly supplied to the driver 13. The output from the comparator 11 is also supplied to the delay circuit 21. The delay circuit normally delivers an output of L level and is adapted to deliver an output of H level only when the level of the output from the comparator 11 is changed from H to L, i.e., only when the battery voltage has come down to the overcharge detection level. This H level of the output from the delay circuit lasts for the predetermined time Td.

A resistor $R_1$ has one end connected to the junction between the plus terminal of the secondary battery 2 and the terminal EB+ of the battery pack, while the other end of the resistor $R_1$ is connected to the non-inversion terminal of the comparator 11. Another resistor $R_2$ has one end connected to the junction between the resistor $R_1$ and the comparator 11, and the other end connected to the minus terminal of the secondary battery 1 via the switch $SW_1$. The switch $SW_1$ is adapted to be turned on and off in accordance with the output from the delay circuit 21.

More specifically, the switch $SW_1$ is adapted to be kept in on state when the level of the output from the delay circuit 21 is H, i.e., for the predetermined period Td from the moment at which the battery voltage comes down to the overcharge detection level. Thus, the switch $SW_1$ is kept off when the level of the output from the delay circuit 21 is off.

A description will now be given of the operation of this charger with specific reference to FIGS. 8A to 8D.

A charger is connected between the terminals EB+ and EB− of the battery pack so that charging current flows therefrom to the secondary battery 1, thus commencing the charging. As a result, the battery voltage rises as shown in FIG. 4A and, when this voltage reaches the reference voltage level, i.e., the overcharge detection level applied to the minus terminal of the comparator 11, the output from the comparator 11 is switched from L to H as indicated in FIG. 8A. This output of H level is delivered to the driver 13.

Figure 8C:
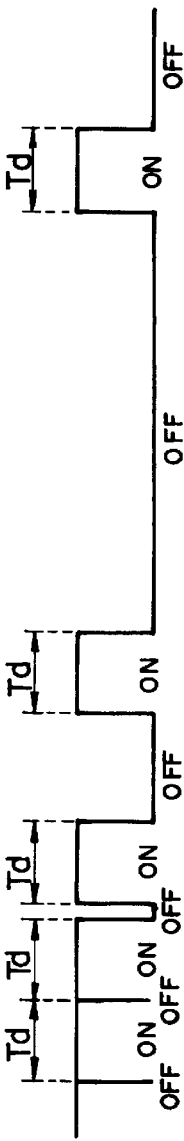
Figure 9:
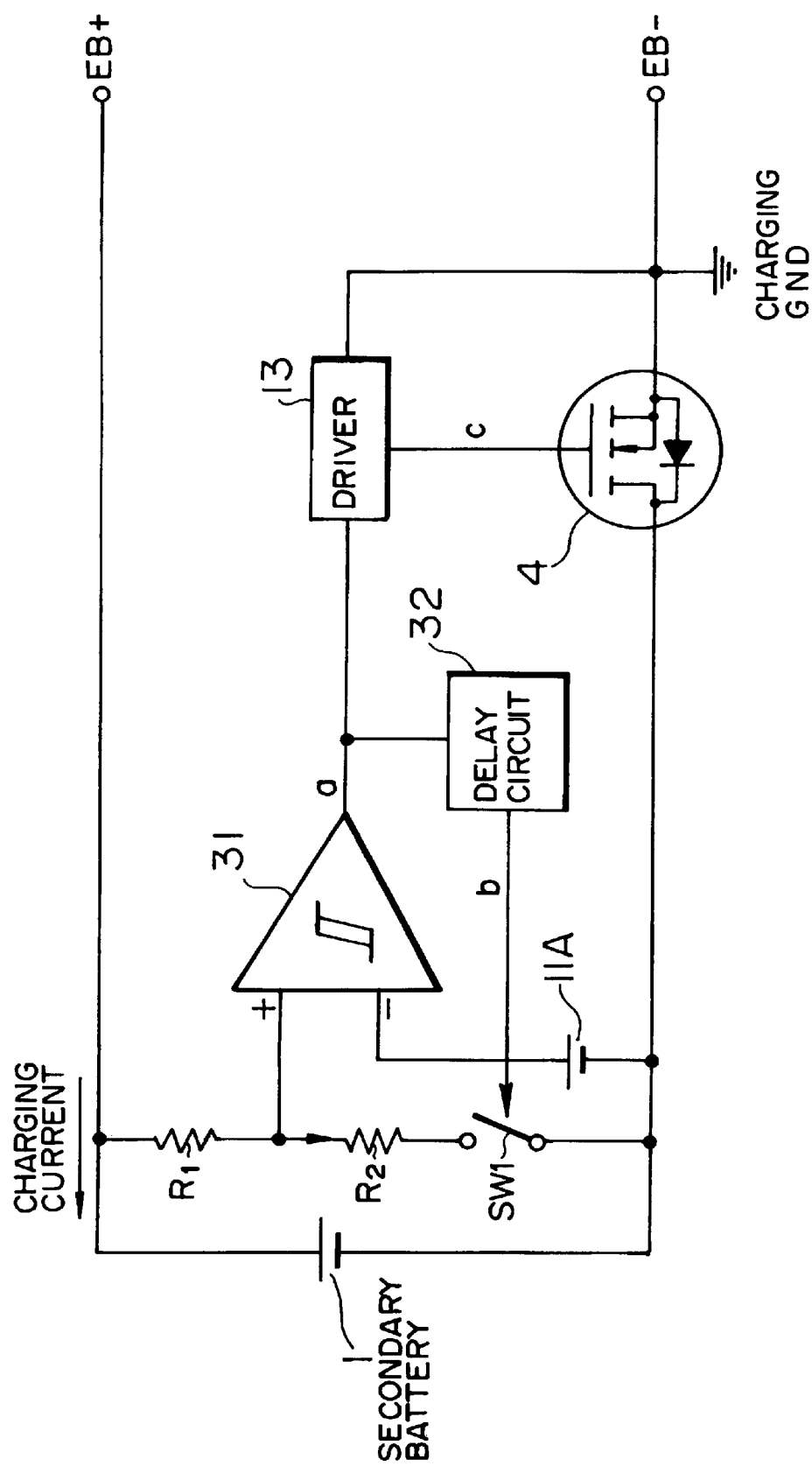
FIG. 9 is an illustration of the construction of another battery pack to be charged in accordance with the second charging method.

As a consequence, the output from the driver 13 is switched to L level as shown in FIG. 8C, whereby the FET 4 is turned off.

As a result, the battery voltage is raised again as shown in FIG. 4A and, when this voltage has reached the overcharge detection level, the FET 4 is turned off without delay, thereby cutting the charging current off.

In this state, the battery voltage is instantaneously lowered to the level equal to or below the overcharge detection level applied by the reference voltage source 11A to the comparator 11, due to internal resistance of the battery.

As a result, the output level of the comparator 11 is switched from H to L as shown in FIG. 8A, so that the output level of the driver 13 is switched from L to H as shown in FIG. 8C, whereby the FET 4 is turned on so as to instantaneously restart the supply of the charging current to the secondary battery 1, as will be seen from FIG. 4B.

As explained before, the drop of the battery voltage is almost fully attributable to the internal resistance, so that the battery voltage, as a result of the re-start of supply of the charging current, recovers the level attained before the cutting off of the charging current, i.e., the voltage which is not lower than the overcharge detection level, as will be seen from FIG. 4A.

It is to be understood, however, that the output of the comparator 11 is supplied not only to the driver 13 but also to the delay circuit 21. As explained before, the delay circuit delivers an output of H level for a period Td from the moment at which the output level of the comparator 21 is changed from H to L, i.e., from the moment at which the battery voltage drops to the overcharge detection level, as will be seen from FIG. 8B.

As a result, the switch $SW_1$ is kept on for the predetermined time Td from the moment at which the battery voltage has come down to the overcharge detection level.

When the switch $SW_1$ is off, no current flows through the resistors $R_1$ and $R_2$. The non-inversion input terminal of the comparator 11 therefore receives the battery voltage. In contrast, when the charging current is being supplied, the current flows through the resistors $R_1$ and $R_2$, so that the non-inversion input terminal of the comparator 11 receives a voltage which is determined by subtracting the voltage drop across the resistor $R_1$ from the battery voltage, i.e., a voltage expressed by $(E_B \times R_2/(R_1+R_2))$.

Therefore, the detection level of the comparator 11, i.e., the battery voltage at which the comparator 11 delivers the H level output, is high in the predetermined period Td from the moment of decrease of the battery voltage to the overcharge detection level, as compared with the detection level in other periods.

Consequently, the battery voltage instantaneously grows to exceed the overcharge detection level, as a result of the supply of the charging current, as shown in FIG. 4A. However, this battery voltage is not detected by the comparator 11 and, hence, the output of the comparator 11 is kept at L level, until the predetermined time Td elapses.

Figure 8D:
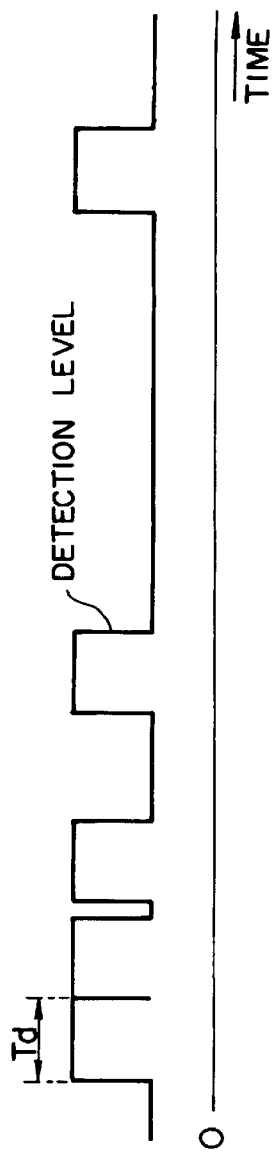

When the time Td has elapsed, the output from the delay circuit 12 is set to L as shown in FIG. 8B and, accordingly, the detection level of the comparator 11 is also lowered as shown in FIG. 8D. Consequently, the comparator 11 detects the battery voltage which is above the overcharge detection level, so that the output level of the comparator 11 is set to H again, as shown in FIG. 8A.

As a result of repetition of the described operation, the charging of the secondary battery 2 proceeds, so that longer time is required for the battery voltage to come down to a level equal to or below the overcharge detection level.

This means that the duration of the H level of the output from the comparator 11 (see FIG. 8A) is prolonged, as well as the duration of the L level of the output from the driver 13 (see FIG. 6C). Consequently, the interval of the charging cycles, i.e., the length of time over which the charging current is interrupted, is prolonged correspondingly, as will be seen from FIG. 4B.

FIG. 9 illustrates another construction of a battery pack which is charged by a second intermittent charging method. In FIG. 9, corresponding portions to those of FIG. 7 are given the same reference numerals.

The battery pack has the same construction as the battery pack of FIG. 7, except that this battery pack has a delay circuit 32 instead of the delay circuit 21, and a comparator (hysteresis comparator) 31 instead of the comparator 11. When the switch SW1 is off, no current flows through resistances $R_1$ and $R_2$, so that a battery voltage is applied to the noninverting input terminal of the comparator 31. On the other hand, when the switch SW1 is on, current flows through resistances $R_1$ and $R_2$, so that a voltage in an amount equal to the battery voltage minus voltage drop due to resistance $R_1$ $[EB \times R_2/(R_1+R_2)]$ is applied to this noninverting input terminal.

The detection level of the comparator 31 output changes with hysteresis. More specifically, when the voltage applied to the noninverting input terminal rises to a value equal to the voltage applied to the inverting input terminal, the comparator 31 generates an H-level signal. On the other hand, the comparator 31 generates an L-level signal, not when the voltage applied to the noninverting input terminal drops down to a value equal to the voltage applied to the noninverting input terminal, but when it drops down to a value somewhat less than the voltage applied to the noninverting input terminal.

With the voltage $V_{OFF}$ determined by $V_{OFF}=V_{REF}-\epsilon$ (where $\epsilon$ is a positive voltage corresponding to the hysteresis of the comparator 31 and $V_{REF}$ is the voltage supplied from the reference voltage supply 11A, that is the overcharge detecting level), when the voltage applied to the noninverting input terminal increases to voltage $V_{REF}$, the output level of the comparator 31 changes from L to H. On the other hand, when the voltage applied to the noninverting input terminal drops down to the voltage $V_{OFF}$, the output level of the comparator 31 changes from H to L. When the comparator 31 output level changes from H to L, and when it changes from H to L, the battery voltage is called the detection level and detection dismissal level, respectively.

When the output level of the comparator 31 changes from H to L, the delay circuit 32 is such as to hold the H level output of the comparator 31 by only a predetermined time, Td.

A description will now be given of its operation, with reference to FIG. 10. When charging of the secondary battery 1 is started by charging current from the charger and the voltage applied to the negative terminal (inverting input terminal) of the comparator 1 reaches the overcharge detection level (that is, when SW1 is turned off), the output level of the comparator 31 changes from L to H, as shown in FIG. 10A.

A change in the output level of the comparator 31 to H causes the driver 13 to generate an L level output, as shown in FIG. 10C, and the FET 4 is turned off. Therefore, a rise in the battery voltage (FIG. 4A) to the overcharge detection level instantly turns off the FET 4, thus turning off the charging current.

The output of the comparator 31 is supplied to the delay circuit 32, in addition to the driver 13. The delay circuit 32 includes, for example, a so-called CR circuit with a resistance and a capacitor. When an H level output is applied from the comparator 31, the output of the CR circuit, as shown in FIG. 10B, instantly reaches a predetermined voltage value. Thereafter, when application of H level signal is stopped (or when the output level of the comparator 31 changes from H to L), the voltage value gradually drops at a predetermined time constant and, after a predetermined time, Td, down to a threshold value $S_2$. While the output level of the comparator 31 is L, the output of the CR circuit is maintained at a predetermined voltage (H level).

When the output of the CR circuit is greater than the threshold value $S_2$ (shaded portions in FIG. 10B), the delay circuit 32 produces an H level output, whereas when it is less than the threshold value $S_2$, the delay circuit 32 produces an L level output. Therefore, when the output level of the comparator 31 changes from L to H, the delay circuit 32 immediately generates an H level signal to the switch SW1, whereas when the output level of the comparator 31 changes from H to L, the delay circuit 32 generates an L level signal to the switch SW 1 after the predetermined time, Td, has elapsed from the time of change of output level.

Accordingly, in this case, the switch SW1 turns on, and current flows through the resistances $R_1$ and $R_2$, and the switch SW1. As in the case illustrated in FIG. 7, the detection dismissal level of the comparator 31 indicated by the dotted lines as well as the detection level indicated by the solid line increases as illustrated in FIG. 10D. In FIG. 10, the resistance values $R_1$ and $R_2$ are set so that the voltage which drops due to the resistance $R_1$ equals the voltage corresponding to the hysteresis of the comparator 31, or the difference between the detection level and the detection dismissal level of the comparator 31. This allows the higher dismissal level to equal the original detection level (or the detection level when no current is flowing through the resistances $R_1$ and $R_2$ and the switch SW1.

It is possible to set the resistances $R_1$ and $R_2$ such that the higher dismissal level does not equal the original detection level, where either one of the levels is greater than the other. The battery voltage becomes the increased dismissal level regardless of the relationship between the increased dismissal level and the original detection level.

When the charging current is turned off, the battery voltage instantly drops below the high detection dismissal level due to a voltage drop caused by internal resistance, as described above. When this occurs, the output level of the comparator 31 changes from H to L (shown in FIG. 10A), so that the output level of the driver 13 changes from L to H (FIG. 10C). This turns on the FET 4 to immediately restart supply of charging current to the secondary battery 1 (shown in FIG. 4B)

As described above, in this case, a drop in battery voltage is in most cases caused by its internal resistance, r, so that turning on the charging current on immediately causes the battery voltage to equal the voltage before the charging current was turned off (FIG. 4A).

On the other hand, the delay circuit 32 produces an H level output until a predetermined time, Td, elapses from the time the output level of the comparator 31 has changed from H to L. Thereafter, it produces an L level output so that current flows through the resistors $R_1$ and $R_2$, and switch SW1 until a predetermined time, Td, from the start of charging current supply. The switch SW1 is then turned off to stop current flow.

Accordingly, until a predetermined time, Td, elapses from the start of supplying charging current, the comparator 31 detection level remains high. After the predetermined time, the detection level drops down to the original value (FIG. 10D).

Therefore, until a predetermined time, Td, from the time charging current is turned on, the battery voltage does not reach the high comparator 31 detection level. Thereafter, when the comparator 31 detection level drops to the original level, the battery voltage becomes greater than the detection level, so that the comparator 31 output level changes from L to H (FIG. 10A).

When this occurs, the driver 13 output level becomes L (FIG. 10C), which turns off the FET 4, so that, in this case, it is turned off again after the predetermined time, Td, from the time the charging current is turned on.

With the aforementioned processes repeated, as the charging of the secondary battery 1 continues, as described above, time is required for the battery voltage to drop to a value below the high comparator 31 dismissal level.

Therefore, the comparator 31 output (FIG. 10A) is at the H level for a long period of time, so that the driver 13 output (FIG. 10C) is at the L level for a long period of time. This causes the charging current to be off for a longer period of time (FIG. 4A).

Figure 11:
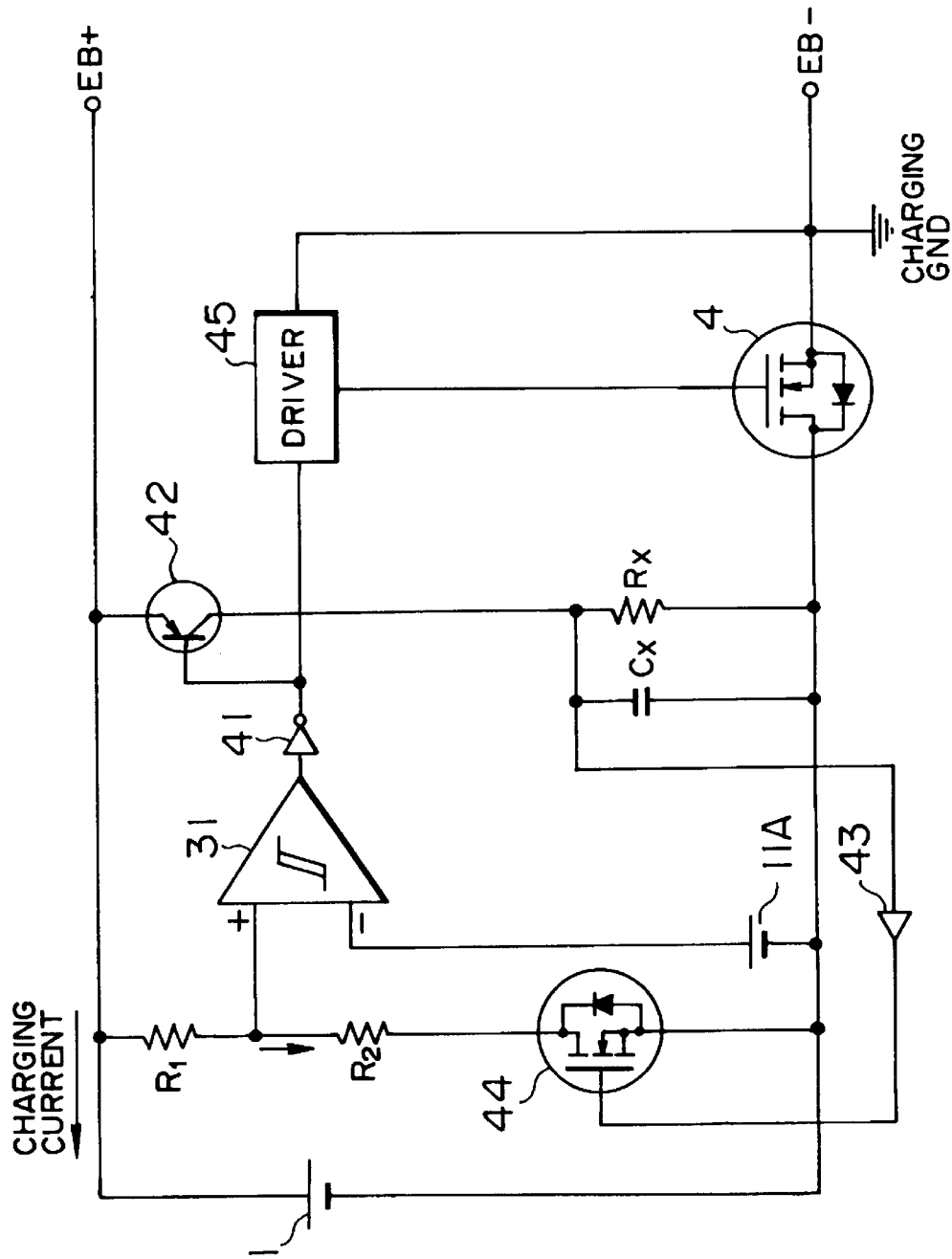
FIG. 11 is an illustration of detail of the construction of the battery pack shown in FIG. 9.

FIG. 11 illustrates in detail a construction of the battery pack of FIG. 9. In the battery pack of FIG. 11, the delay circuit 32 has an inverter 41, a PNP transistor 42, a resistor $R_X$, a capacitor $C_X$, and a buffer 43, with an FET (N-channel MOS FET) 44 used in the switch SW1. In addition, a driver 45 is provided in place of the driver 13. The driver 45 is constructed in the same way as the driver 13, except that in the driver 45 construction the signal applied to the FET 4 gate is of the same level (non-inverted form as in the driver 13) as the signal input to the driver 45.

The FET 44 drain is connected to the end of the resistor $R_2$ which is not connected to the resistor $R_1$ is not connected, while the source is connected to the negative terminal of the secondary battery 1. The gate of the FET 44 is connected to the output terminal of the buffer 43.

The input terminal of the inverter 41 making up the delay circuit 32 is connected to the output terminal of the comparator 31. The output terminal of the inverter 41 is connected to the driver 45 and the base of the transistor 42. The emitter of the transistor 42 is connected to the positive terminal of the secondary battery 1, while the collector is connected to one end of the resistor $R_X$.

The negative terminal of the secondary battery 1 is connected to the other end of the resistor $R_X$. The connection point of the resistor $R_X$ and the collector of the transistor 42 is connected to one end of the capacitor $C_X$ and the output terminal of the buffer 43. The other end of the capacitor $C_X$ is connected to the negative terminal of the secondary battery 1.

In this battery pack, the predetermined time, Td, is set by a time constant determined by the resistance $R_X$ and the capacitor $C_X$.

In the battery pack having the above-described construction, when charging is started and the battery voltage becomes greater than the overcharge detection level, as described above, the output level of the comparator 31 changes from L to H. The output level of this signal is changed to L via the inverter 41, and the resulting signal is applied to the gate of the FET 4, so that the charging current is turned off.

The L-level signal, output from the inverter 41, is applied also to the base of the transistor 42, which causes the transistor 42 to be in an on state. This causes current to flow from the emitter to the collector of the transistor, resulting in immediate charging of the capacitor $C_X$.

A high voltage occurs at point Pl, and an H-level signal is applied to the gate of the FET 44. This turns on the FET 44, which allows current to flow through the resistors $R_1$ and $R_2$, so that, as illustrated in FIG. 10, the comparator 31 detection level and detection dismissal level are increased.

Here, when the signal level, applied to the input terminal of the buffer 43, is greater than the threshold value S2 of FIG. 10, the buffer 43 produces an H-level output, whereas when it is smaller, the buffer produces an L-level output.

As illustrated in FIGS. 9 and 10, turning off the charging current causes instant drop of the battery voltage to a value below the detection level, so that the output level of the comparator 31 changes from H to L. This turns on the FET 4, which immediately re-supplies charging current to the secondary battery 1.

Upon starting supply of charging current, the battery voltage instantly rises, as described above. In this case, the detection level of the comparator 31 is high, so that the output of the comparator 31 remains at level L.

Thereafter, when the capacitor $C_X$ discharges to the point the voltage at point P1 is less than the threshold value S2, or in other words, when the predetermined time, Td, has elapsed from the time the output level of the comparator 31 changes from H to L, the output level of the buffer 43 becomes L. This turns off the FET 44, which stops current flow through the resistors $R_1$ and $R_2$, so that the comparator 31 detection level and detection dismissal level drops down to their respective original levels.

At the comparator 31, a battery voltage greater than the overcharge detection level is detected, and charging is, hereafter, carried out in the same way.

A description will be given of the method used for charging a battery by detecting $-\Delta V$ using an aqueous-type charger, before a description of the method used to charge the above-described battery pack with an aqueous-type charger.

As described above, when the battery is fully charged, the $-\Delta V$ can be detected, in charging an aqueous-type battery such as an NiCd battery, so that the aqueous-type charger completes charging the battery upon detection of the $-\Delta V$.

Figure 12:
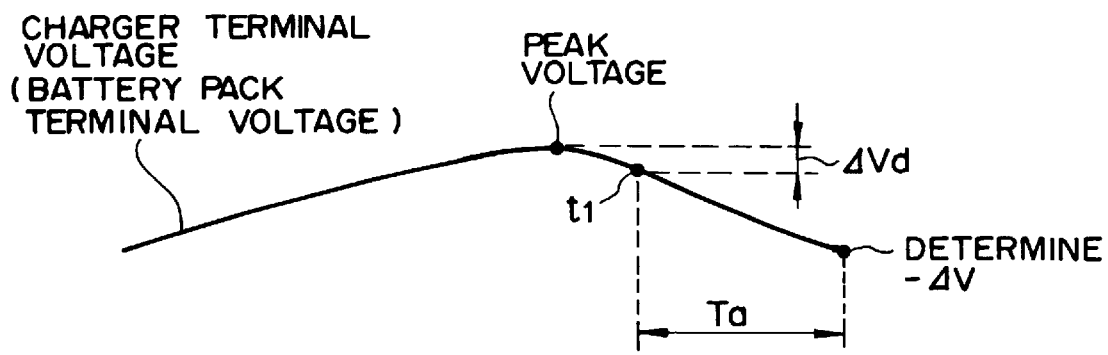
FIG. 12 is an illustration of a method for detecting voltage drop $-\Delta V$.

More specifically, when an aqueous-type battery is charged by an aqueous-type charger, as illustrated in FIG. 12, the voltage between the terminals of the aqueous-type charger (which, in this case, is equal to the voltage between the terminals of the aqueous-type battery) rises, as the battery is charged, to a peak value, and then drops. Upon detection of the peak voltage, the aqueous-type charger compares this peak voltage with the voltage between the terminals that drops after the peak voltage has been reached. If the voltage between the terminals, until passage of a predetermined time, Ta, from time, t1 (when the difference equals a predetermined value, $\Delta V$), is less than the voltage between the terminals at t1, then, at the point the predetermined time, Ta, elapses, the charging is completed because $-\Delta V$ has been detected.

To eliminate the effects of noise or the like, as a $-\Delta V$ value to be detected, the aqueous-type charger uses a voltage value obtained by moving averaging the actual voltage between the terminals by a predetermined averaging width Tab.

Here, data of the moving averaged value by a predetermined averaging width, Tab, is defined as follows. With the averaging width, Tab, is considered as moving in the direction time proceeds, when new data is incorporated in the averaging width, Tab, it is the value obtained by subtracting the time unit average value from the previously incorporated total sum data and adding the new data to the subtracted value by the averaging width, Tab.

Figure 13:
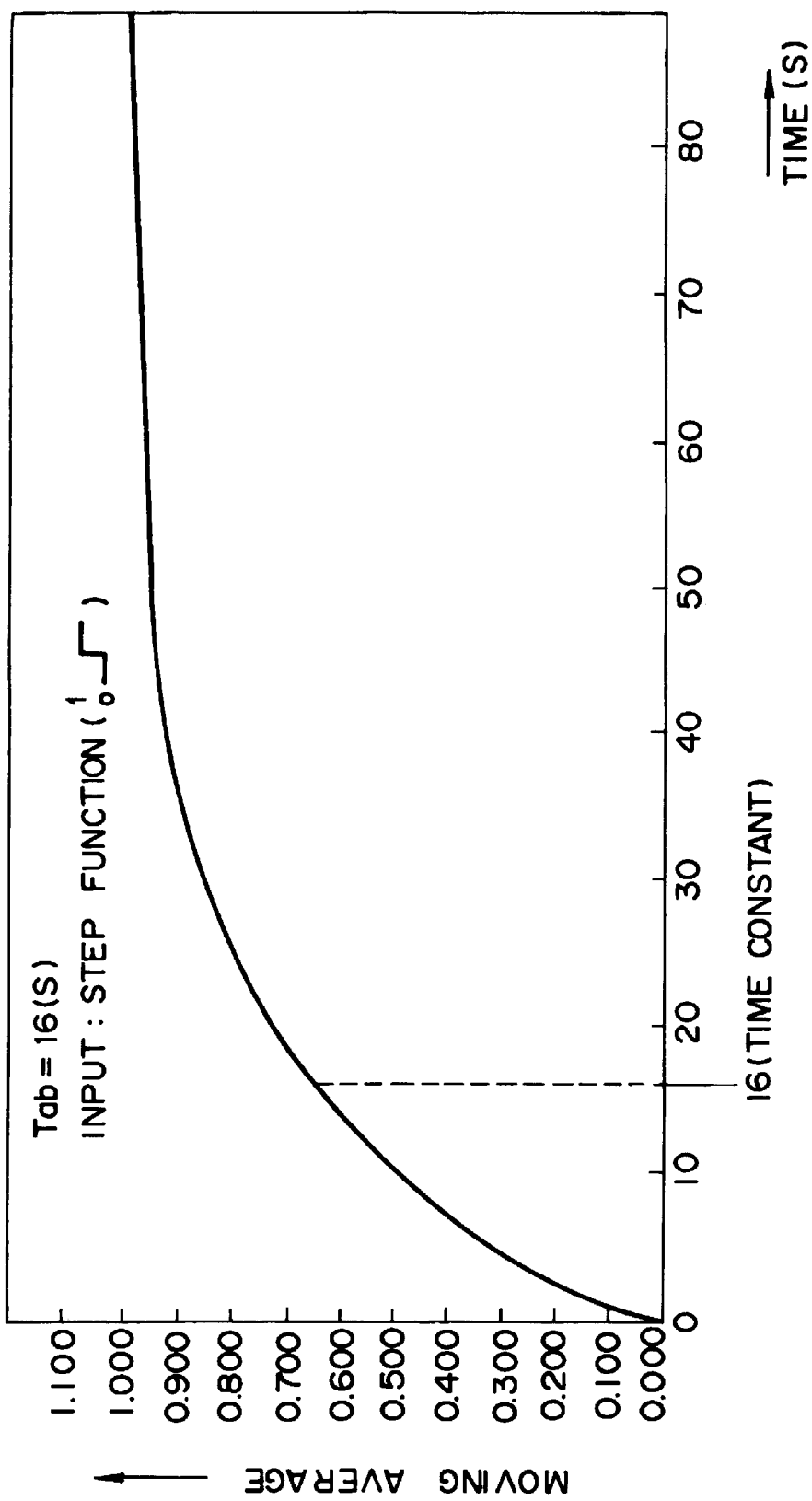
FIG. 13 is a graph showing moving average of a step function.

This moving averaging value is equivalent to the value obtained by passing data through a low-pass filter (RC filter), composed of a resistor and a capacitor, at a time constant of Tab. FIG. 13 shows the step function moving average value when Tab is 16 seconds.

When an aqueous-type charger is used to charge the above-described battery pack, voltage between the terminals (of the water-type charger) is as shown in FIGS. 3C and 4C. The moving average thereof is shown in FIG. 14.

Figure 14A:
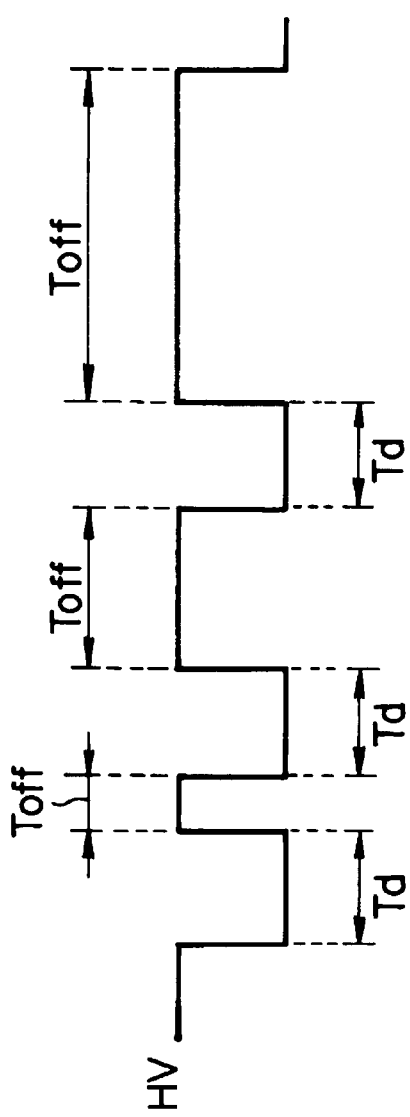
FIGS. 14A and 14B are waveform charts illustrative of terminal voltage and moving average of the terminal voltage of a charger which is being used for charging a battery pack.
Figure 14B:
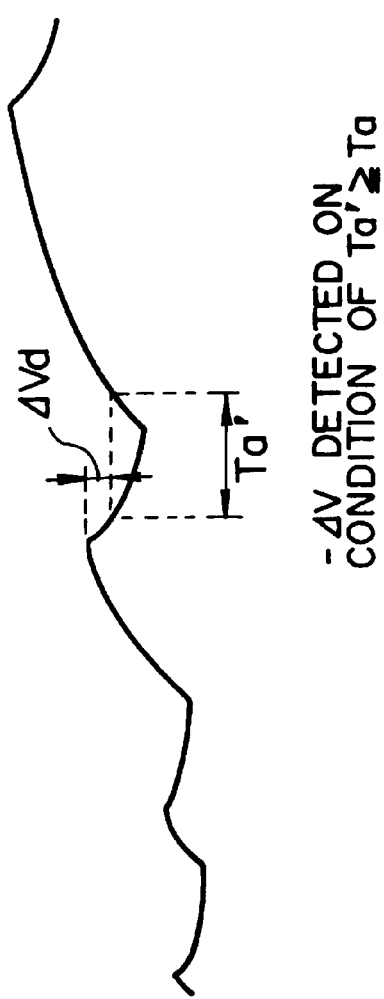

More specifically, FIG. 14A shows the voltage between the terminals of the charger during a certain time period when a battery pack incorporating a non-water battery, is being charged, while FIG. 14B shows the moving average value. As shown in FIGS. 3C and 4C, the lower voltage between the terminals of a charger actually corresponds to the battery voltage, so that as the battery is charged, it gradually increases. For simplification, however, voltage level shown at the lower portion of FIG. 14A (as well as the voltage level between terminals of a charger described below) will be shown as a fixed value.

The moving average of the voltage between the terminals of a charger (FIG. 14B) gradually rises during the time the charging current is turned off (or voltage drop time), Toff. On the other hand, during the time the charging current is turned on (or charging time), Td, the moving average gradually decreases. The affects of the previous voltage (included in the averaging width Tab) between the terminals of a charger gradually becomes prominent, so that on the whole, as the battery is charged, the moving average value increases gradually. Accordingly, as illustrated in FIG. 14B, if period Ta', which is the period from t1 (the difference between the moving average at this point and that at the peak point which occurs when Toff changes to Td being $\Delta V d$) to t2 (the point at which the moving average value is equal to the moving average value at point t1), is greater than the period, Ta, of FIG. 12, a so-called pseudo $-\Delta V$ value is detected when charging the battery pack incorporating a non-water battery with a water-type charger.

Consideration will now be given of the relationships among the following parameters used to determine the moving average: the averaging width, Tab; period during which charging current is turned off, Toff; period during which charging current is on, Td; voltage drop, $\Delta V d$, from the peak point required for detecting $-\Delta V$; and period required to detect $-\Delta V$, Ta.

When Tab is very small, for example when it is 0, the moving average value, as indicated in FIG. 15A, is the voltage between the terminals of a charger. In this case, the moving average value changes greatly during the transition from Toff to Td, so that a potential difference of $\Delta V d$ is produced each time, at a timing the time period changes from Toff to Td. Therefore, if Td>Ta, after the transition from Toff to Td, in general, $-\Delta V$ is detected each time, whereas if Td$\leq$Ta, the $-\Delta V$ value will not be continuously detected without end (when Toff changes to Td, because the moving average is less than the moving average at the point the voltage difference is $\Delta V d$ as measured from the point for not longer than Ta.

FIGS. 15B and 15C shows moving average values of the voltage between the terminals of the charger of FIG. 15A in which Tab has been made relatively small and large, respectively. As can be seen from FIGS. 15B and 15C, the change in the moving average value is more abrupt, the smaller the Tab, whereas it is more smooth the larger the Tab. The point at which a potential difference of a certain amount occurs as measured from to the peak point (moving average value difference) (ΔVd) does not occur until Toff becomes relatively large. The point at which a relatively large potential difference (moving average value difference) (ΔVd) occurs as measured from the peak point does not occur unless Toff is large because the larger the Tab, the smoother the change in the moving average value. It is to be noted that if Tab is not zero, −ΔV can be detected not only when Td>Ta but also when Td≦Ta because the moving average value rises gradually after the transition from Td to Toff.

When the voltage drop from the peak point, ΔVd, required to detect −ΔV is small, the −ΔV value can be detected when Toff is small, that is when the rise in the moving average value is not so large. On the other hand, when ΔVd is large, the −ΔV value cannot be detected until Toff is large, that is until the rise in the moving average value is large. If ΔVd is small, the period during which a potential difference of ΔVd as measured from the peak point is longer, so that −ΔV can be detected even when Td is short.

As can be understood from the foregoing description, the detection of −ΔV in the aqueous-type charger is dependent on Tab, Toff, Td, Ta, and ΔVd, as well open voltage, HV, of the water-type charger and the overcharge detection level, LV.

Of the aforementioned parameters, Tab, Ta, ΔVd, and HV are previously fixed in accordance with the aqueous-type charger, while Td, Toff, and LV are basically fixed in accordance with the battery pack. Among Td, Toff, and LV, Toff is essentially determined by how much the secondary battery 1 has been charged, while LV is determined by the type of secondary battery 1 used. Therefore, setting Td to an appropriate value allows −ΔV to be detected and the charging to end normally, when charging a battery pack containing a non-water type secondary battery 1 by an aqueous-type charger.

With Tab=16 seconds, ΔVd=80 mV, Ta=60 seconds, HV=10 V, and LV=8.4 V, the minimum Td required to detect −ΔV was determined. The calculation results, which showed that Td is dependent on Toff:Td, are described in detail below.

Figure 16:
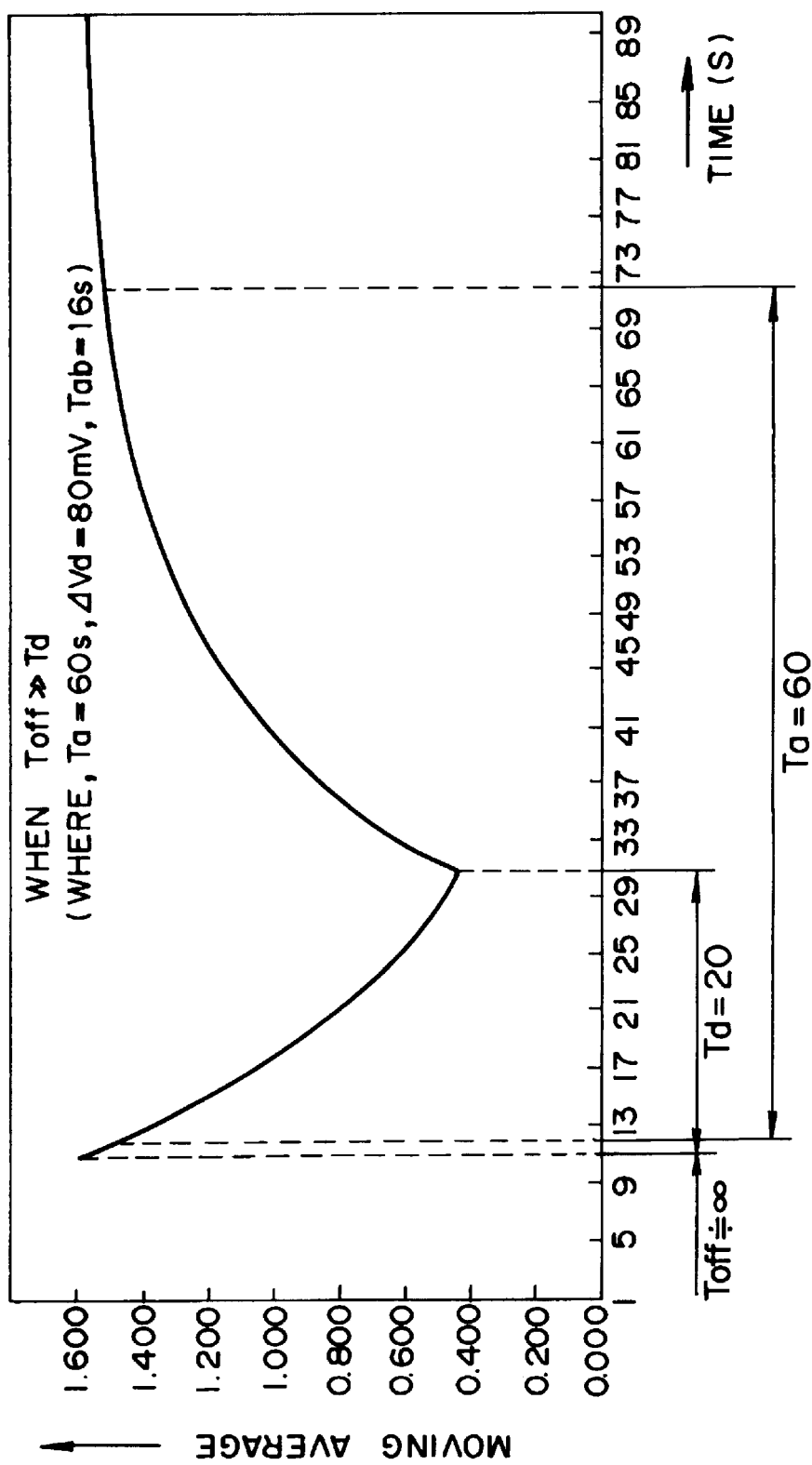
FIG. 16 is an illustration of the moving average of charger terminal voltage.
Figure 17:
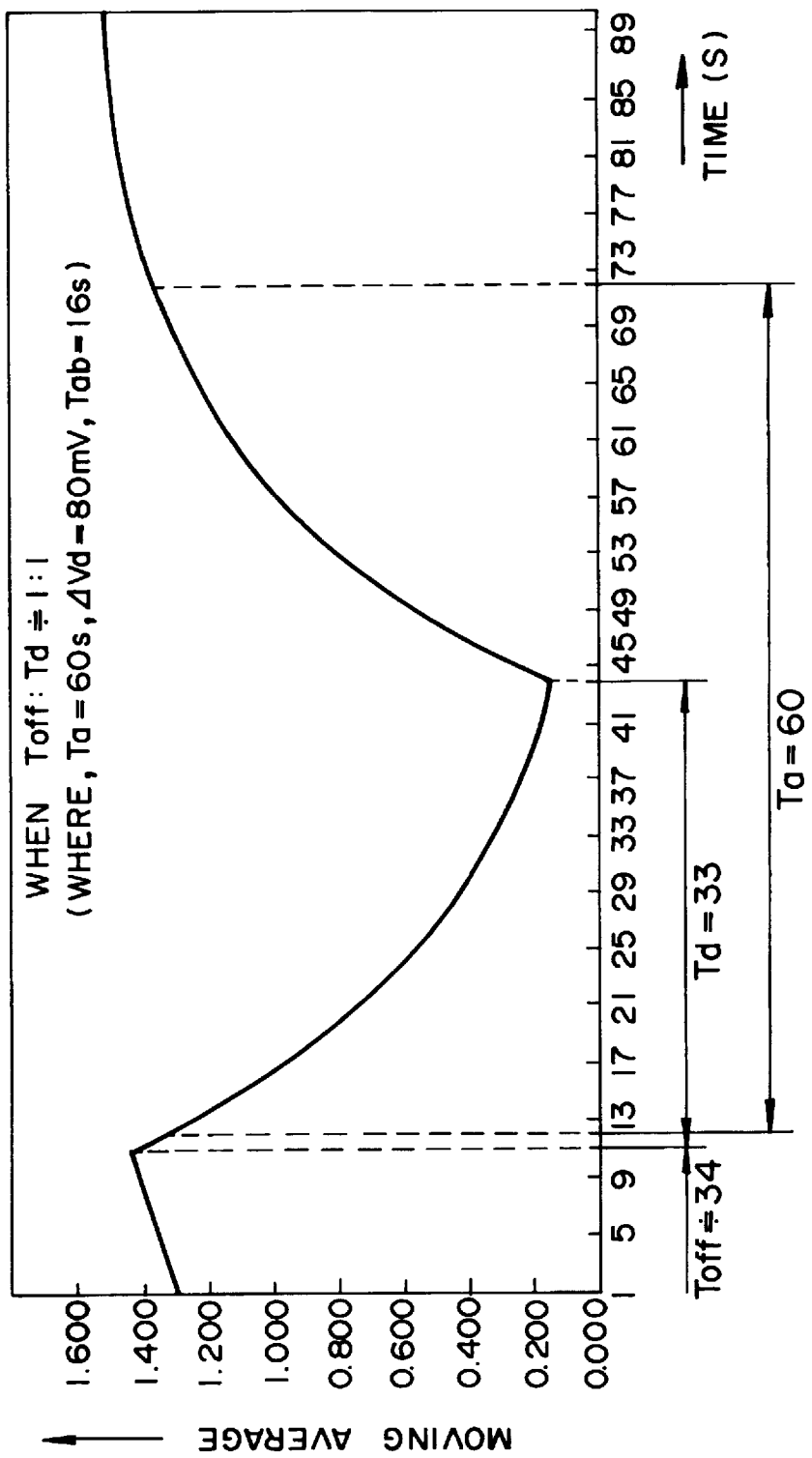
FIG. 17 is an illustration of the moving average of charger terminal voltage.
Figure 18:
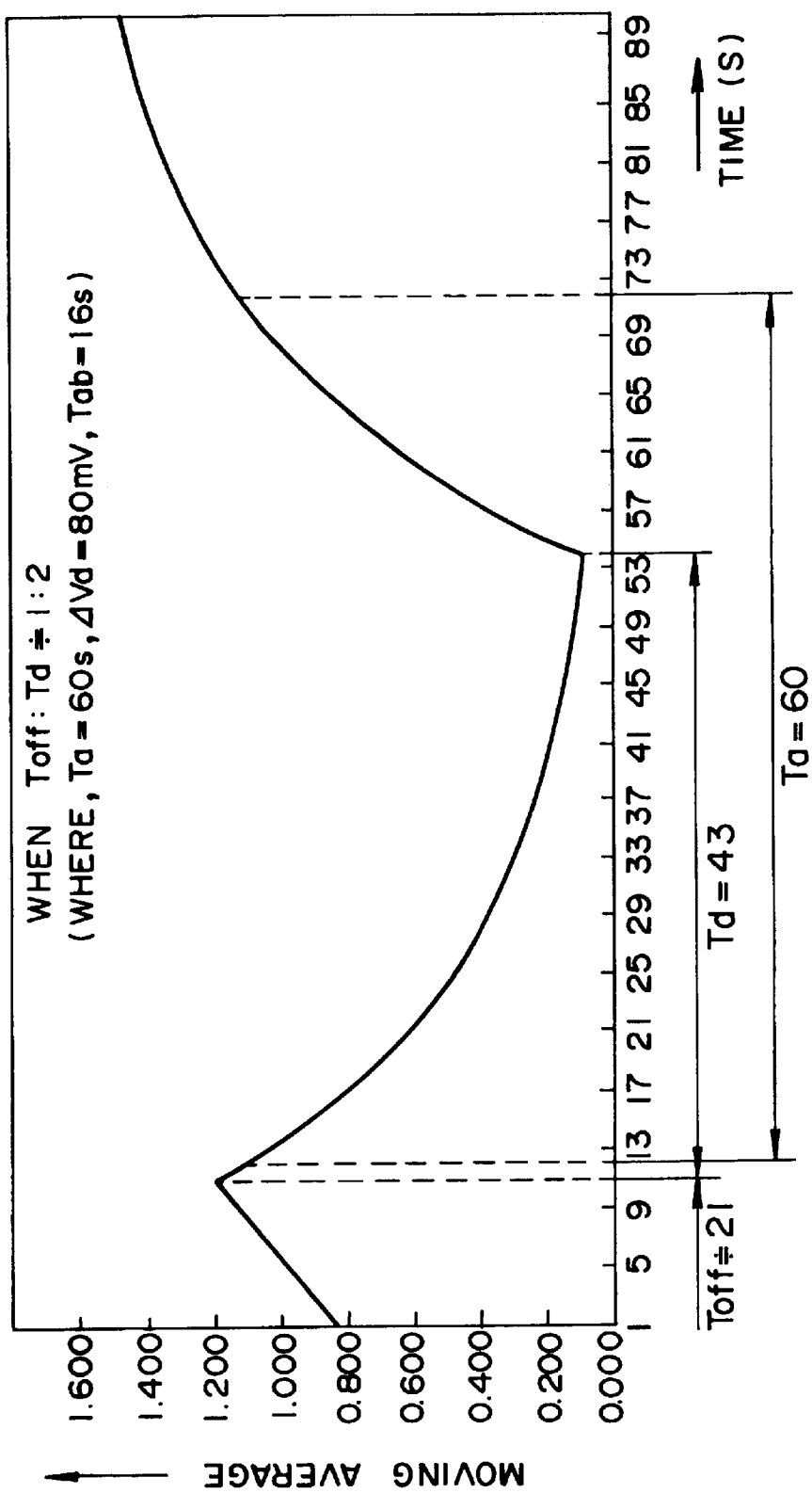
FIG. 18 is an illustration of the moving average of charger terminal voltage.

When Toff is sufficiently larger than Td (Toff:Td :1), the minimum Td required to detect −ΔV is approximately 20 seconds in relation to the moving average value as illustrated in FIG. 16. On the other hand, when Toff is approximately equal to Td (Toff:Td 1:1), the minimum Td required to detect −ΔV is approximately 33 seconds in relation to the moving average value, as shown in FIG. 17. When Toff is about half of Td (Toff:Td 1:2), the minimum Td required to detect −ΔV is about 43 seconds in relation to the moving average value, as illustrated in FIG. 18.

Therefore, Td must be greater than 20 seconds to sufficiently charge a non-water battery pack (or battery pack containing a non-water secondary battery) by an aqueous-type charger having the aforementioned specification and detect −ΔV at this point, or at the point Toff is sufficiently large.

Although depending on the aqueous-type charger with the aforementioned specification, a non-water type battery pack can be sufficiently charged, at which point −ΔV is unfailingly detected, when Td is greater than 20 seconds, this does not necessarily mean that a non-water type battery pack can be properly charged with an aqueous-type charger having a different specification.

More specifically, it does not necessarily follow that Td, which is an appropriate charging time for an aqueous-type charger, is an appropriate charging time for other types of aqueous-type chargers. Although, hitherto, Td has been fixed for conventional non-water battery packs, this fixed Td is not necessarily an appropriate charging time to allow sufficient and safe charging of a non-water type battery pack.

More specifically, for example, there are cases when −ΔV is detected and the charging completed before the battery has been sufficiently charged by a certain aqueous-type charger. In addition, there are cases when charging is continued even after the battery has been sufficiently charged by another type of aqueous-type charger because −ΔV detection could not be carried out. These cases are not desirable from the viewpoint of safety. There are some aqueous-type chargers which halt the charging and indicate a charging error, when −ΔV cannot be detected for a long time. In this case, the user judges that charging is not normal, even though the battery is being sufficiently charged.

To achieve sufficient and safe charging of a non-water type battery pack, regardless of the type of aqueous-type charger, Td can be changed in correspondence with how much the secondary battery 1 has been charged so that −ΔV is detected only at a moment the battery has been sufficiently charged.

Figure 19A:
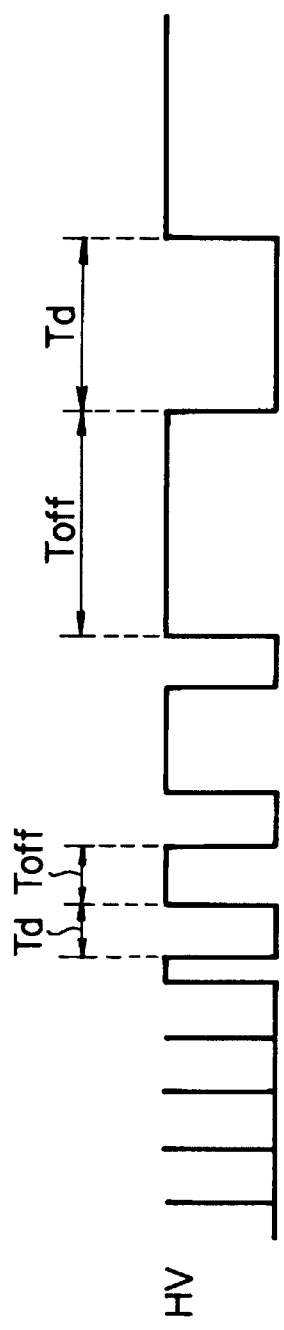
FIGS. 19A and 19B are illustrations of a first principle of the present invention.

FIG. 19 is used to describe a first principle of the present invention. As illustrated in FIG. 19A, in the first principle, at the time charging is started, Td of the voltage between the terminals of a charger is made small so as not to allow detection of −ΔV by the aqueous-type charger. Since Toff increases as charging of the battery proceeds, Td is made larger, accordingly. It is to be noted that Td is made small until Toff from the start of charging becomes relatively long. After Toff becomes relatively long, Td may be discretely increased.

Figure 19B:
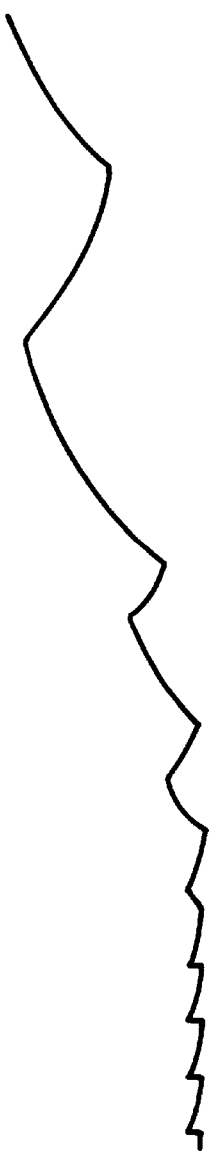

As can be understood from the foregoing description, the moving average value of the voltage between the terminals of a charger when Td is changed is as illustrated in FIG. 19B. Referring to the same figure, while Toff is short, Td is short. Therefore, the point at which the potential difference is ΔVd as measured from the peak point generally does not occur, or if it does occur the period the potential difference is ΔVd as measured from the peak point is short, so that −ΔV is not detected. Charging continues to sufficiently charge the battery and Toff becomes relatively long. After this happens, Td is increased, which causes a point at which the potential difference is ΔVd as measured from the peak point to occur. In addition, the time the potential difference is ΔVd from the peak point becomes longer, which causes −ΔV to be detected.

Figure 20:
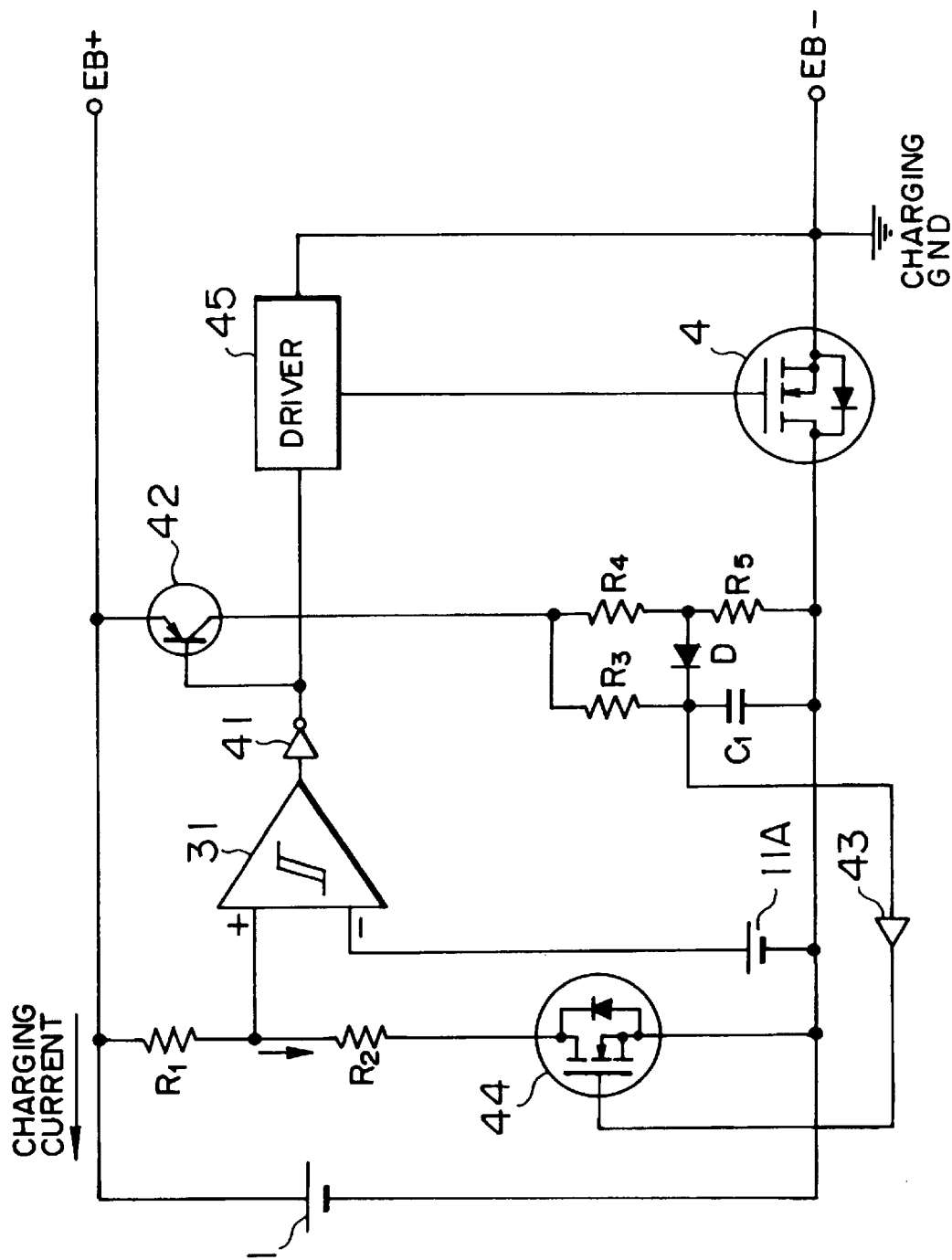
FIG. 20 is an illustration of the construction of a first embodiment of the battery pack incorporating the present invention.

FIG. 20 illustrates a construction of a battery pack to be charged (in a first embodiment to which the present invention is applied) based on the aforementioned first principle. In the figure, corresponding parts to those of FIG. 11 are given the same reference numerals. The battery pack of FIG. 20 is constructed in the same way as the battery pack of FIG. 11, except that in place of the resistor $R_X$ and the capacitor $C_X$ resistors $R_3$ to $R_5$, a capacitor C1, and a diode D are provided.

One end of resistor R4 is connected to the collector of transistor 42, while the other end is connected to the negative terminal of the secondary battery 1 via the resistor $R_5$. The connection point of the resistors R4 and R5 are connected to the anode of the diode D, while the cathode is connected to one end of the resistor R3. The other end of the resistor R3 is connected to the connection point of transistor 42 and the resistor R4. One end of the capacitor C1 is connected to the connection point of the diode, D, and the resistor, R3, while the other end is connected to the negative terminal of the secondary battery 1. The connection point of the resistor R3 and the capacitor C1 is connected to the output terminal of the buffer 43.

In the battery pack with the aforementioned construction, as illustrated in FIG. 11, when the battery voltage becomes greater than the overcharge detection level and the comparator 31 produces an H-level output to turn on the transistor 42, current flows to the capacitor C1 through path W1 and path W2. In path W1, current flows from the transistor 42, through the resistor R4 and the diode D, and then to the capacitor C1, while in path W2, current flows from the transistor 42, through the resistor R3 and then to the capacitor C1. When the secondary battery 1 is not sufficiently charged, as described above, although the output level of the comparator 31 immediately switches back to L even when it is H, in such a short period of time, almost no current flows through path W2, so that, in this case, the capacitor C1 is charged by the current which flows through the path W1 including the diode, D.

In this case, the amount of charging of the capacitor C1 depends on the potential difference ratio of the resistors R4 to R5. In the battery pack of FIG. 20, the resistances R4 and R5 are set so as to decrease the charge on the capacitor C1. Therefore, the capacitor C1 is discharged for a short time. Consequently, the time the output level of the buffer 43 which corresponds to the output of the delay circuit 32 of FIG. 10B is H, (that is the time, Td, the FET 4 is turned on after the battery voltage has exceeded the overcharge detection level), is short for some time from the start of charging.

When the battery continues to be charged and Toff increases, that is when the comparator 31 produces an H-level output for a longer time, the time the transistor 42 is turned on increases. This causes the capacitor 31 to be charged, not only by the current which flows through the path W1, but also by the current which flows through the path W2.

Accordingly, an increase in Toff increases the time the buffer 43 produces an H-level output (that is the time, Td, that the FET 4 is on after the battery voltage has exceeded the overcharge detection level), when the battery is sufficiently charged. Therefore, as illustrated in FIG. 19, when the battery is sufficiently charged, −ΔV is detected in the aqueous-type charger.

In the intermittent charging illustrated in FIGS. 3 and 4, the secondary battery 1 functions improperly when the charging current is larger than the capacity of the secondary battery 1, that is, for example, when the charging current of the aqueous-type charger is IC (for example, a current of 1000 mA flows through a battery with a capacity of 1000 mAH) even when the capacity of the secondary battery is small. This is because in the intermittent charging, charging current is forced to flow even after the battery voltage has become greater than the overcharge detection level. This problem can be overcome by turning on and off the charging current at a high frequency, during Td, and reducing the equivalent average current value of the charging current after the battery voltage has become greater than the overcharge detection level. FIGS. 21A and 21B illustrate, respectively, the battery voltage and the voltage between terminals of a charger when the charging current is turned on/off at a high frequency.

Figure 22:
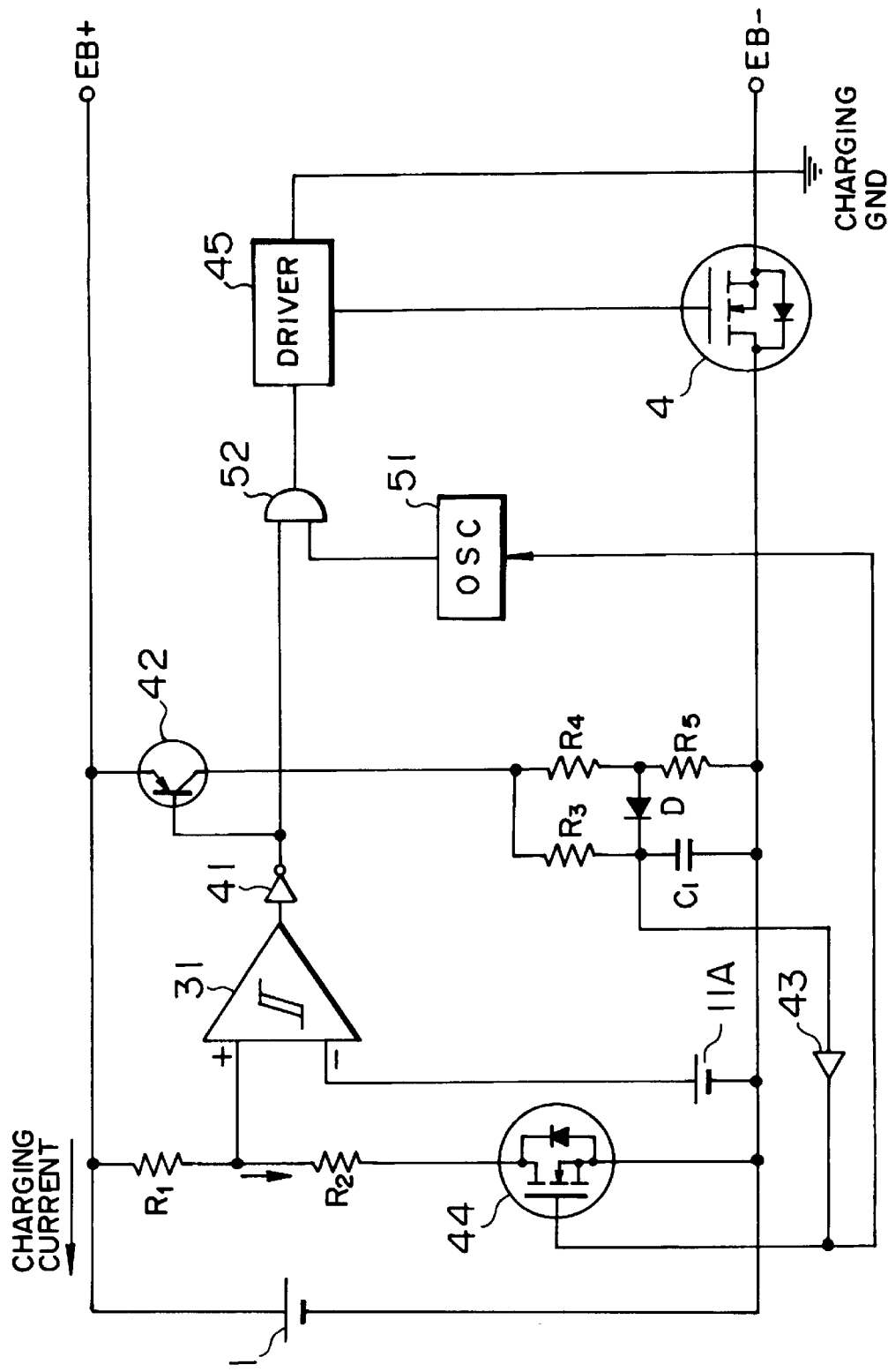
FIG. 22 is an illustration of a construction of a second embodiment of the battery pack incorporating the present invention.

The battery pack is constructed as in FIG. 22 because the FET 4 needs to be turned on/off at a high frequency to turn on/off the charging current at a high frequency.

FIG. 22 illustrates a construction of a battery pack in the second embodiment to which the present invention is applied. Referring to the same figure, corresponding portions as those to FIG. 20 are given the same reference numerals. The battery pack of FIG. 22 has the same construction as the battery pack of FIG. 20, except that an oscillator (OSC) 51 and an AND gate 52 are further provided.

The output of the buffer 43 is supplied to the oscillator 51. The oscillator 51 stops operating and supplies an H-level signal to one of the input terminals of the AND gate 52, when the output level of the buffer 43 is L, whereas it operates and supplies a predetermined high-frequency pulse one of the input terminals, when the output level of the buffer 43 is H. Therefore, it is only during Td that the oscillator 51 supplies a high-frequency pulse to one of the input terminals of the AND gate 52, while at other times, it supplies an H-level signal.

The other input terminal of the AND gate is connected to the inverter 41, while the output terminal is connected to the driver 45. Accordingly, outside Td, the AND gate 52 produces the output of the comparator 31, as it is, through the inverter 41, whereas during Td, it produces an output which changes level in accordance with the pulse output from the oscillator 51, since an H-level output is produced by the comparator 31 via the inverter 41. This causes the FET 4 to turn on and off in accordance with the pulse output from the oscillator, during Td, so that the charging current is turned on and off at a high frequency accordingly. This makes it possible to prevent improper operation of the secondary battery 1.

Figure 23:
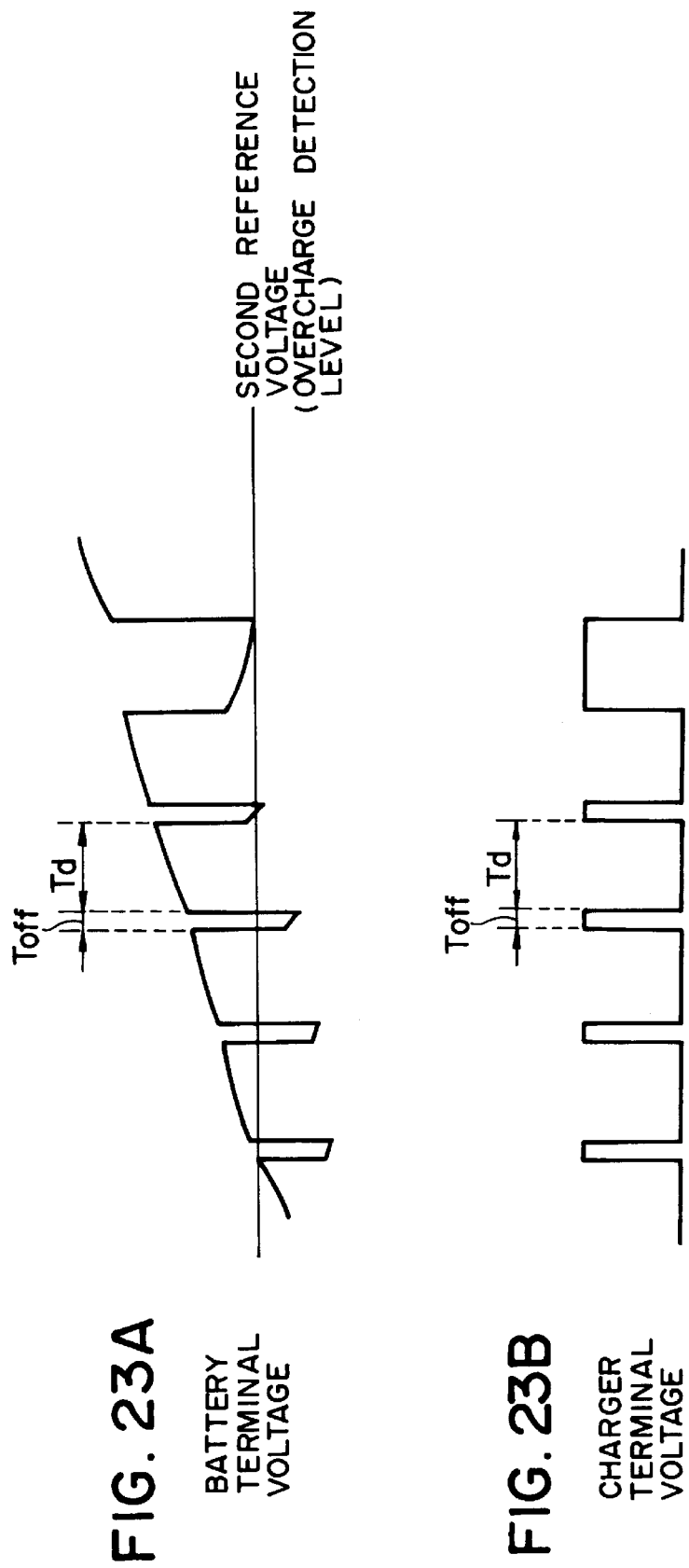
FIGS. 23A and 23B are waveform charts showing secondary battery terminal voltage and charger terminal voltage, as observed when a battery pack shown in FIG. 24 is charged.

Improper operation of the secondary battery 1 can also be prevented by stopping the charging current for at least a predetermined time period, regardless of the battery voltage, after the charging current has been temporarily turned off (or when charging is stopped) as a result of the battery voltage becoming greater than the overcharge detection level. More specifically, even when Toff becomes greater than a predetermined fixed period, it is possible to reduce the equivalent average current value of the charging current. (When the battery voltage exceeds the overcharge detection level, it is preferable to set a duty ratio for the charging current such that it becomes less than, for example, 0.5 C.) FIGS. 23A and 23B illustrate, respectively, the battery voltage and the voltage between terminals of a charger when Toff is greater than a predetermined fixed period.

Figure 24:
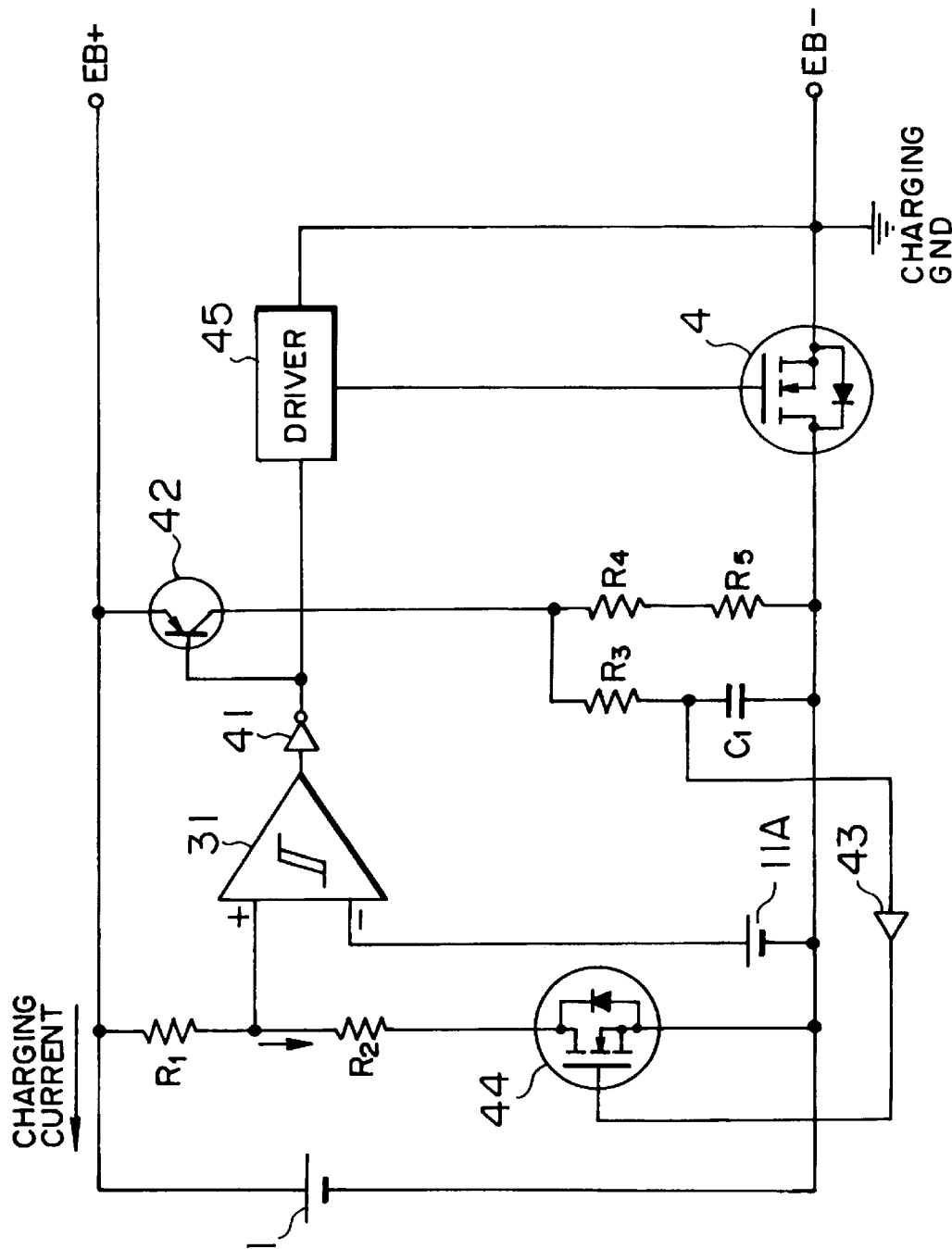
FIG. 24 is an illustration of a construction of a third embodiment of the battery pack incorporating the present invention

FIG. 24 illustrates a construction of a battery pack (in the third embodiment to which the present invention is applied) charged in the aforementioned way. In the figure, corresponding parts to those of FIG. 20 are given the same reference numerals. The battery pack of FIG. 24 has the same construction as the battery pack of FIG. 20, except that diode D is not included.

Accordingly, the capacitor C1 of the battery pack is charged only by the current flowing through the aforementioned path W2 (or the path including the resistor R3), so that time is required for charging. This means that the FET 44 is not immediately turned on, even when the battery voltage becomes greater than the overcharge detection level and the output level of the comparator 31 changes to H. The FET 44 is turned on after a predetermined time has elapsed to charge the capacitor C1 by a predetermined amount.

Therefore, even when the battery voltage is greater than the overcharge level and the FET 4 is turned off, which results in an instant voltage drop of the battery, the detection dismissal level of the comparator 31 does not rise until the passage of the predetermined time from the time the battery voltage is greater than the overcharge level. Consequently, during this time, the output of the comparator 31 remains at the H level, or in other words the FET 4 remains off, so that, as described above, Toff becomes greater than the predetermined fixed time period.

A description will now be given of a second principle of the present invention. Referring to FIG. 25A, as with the first principle, at the start of charging, with Td made small so as not to allow detection of −ΔV by an aqueous-type charger, the battery is sufficiently charged, followed by detection of a relatively large Toff, after which this is made extremely small. The period when Td is very small is larger than Ta.

The moving average value of the voltage between terminals of a charger, when Td is varied, as illustrated in FIG. 25B. As can be understood from the figure, when Toff is small, −ΔV is not detected, as in FIG. 19. After the battery is sufficiently charged and Toff becomes relatively large, when Td is made very small, that is when the charging current is on only for a very short time, the time period, Toff, the battery voltage drops down to the overcharge detection level, also becomes small.

Accordingly, the voltage between the terminals of a charger after Toff has become relatively large is in the form of a pulse wave with a short period, as illustrated in FIG. 25A. When Td and Toff is repeatedly small after Toff has become relatively large, a peak point occurs, after the relatively long Toff ends, in the moving average value of the voltage between the terminals of a charger, as illustrated in FIG. 25B. Thereafter, the moving average value, which is less than the moving average value at the peak point, varies in a zigzag fashion down to a value determined by the ratio between Td and Toff. Therefore, in this case, there is a point where the potential difference with reference to that at the peak point is ΔVd. In addition, since Td, which is made very small, is larger in value than Ta, the potential difference with reference to that at the peak point remains ΔVd for a longer period of time than Ta, which allows detection of −ΔV.

The larger Td is compared to Toff, the larger the slope of the moving average value line, as illustrated by the dotted line of FIG. 25B.

Figure 26:
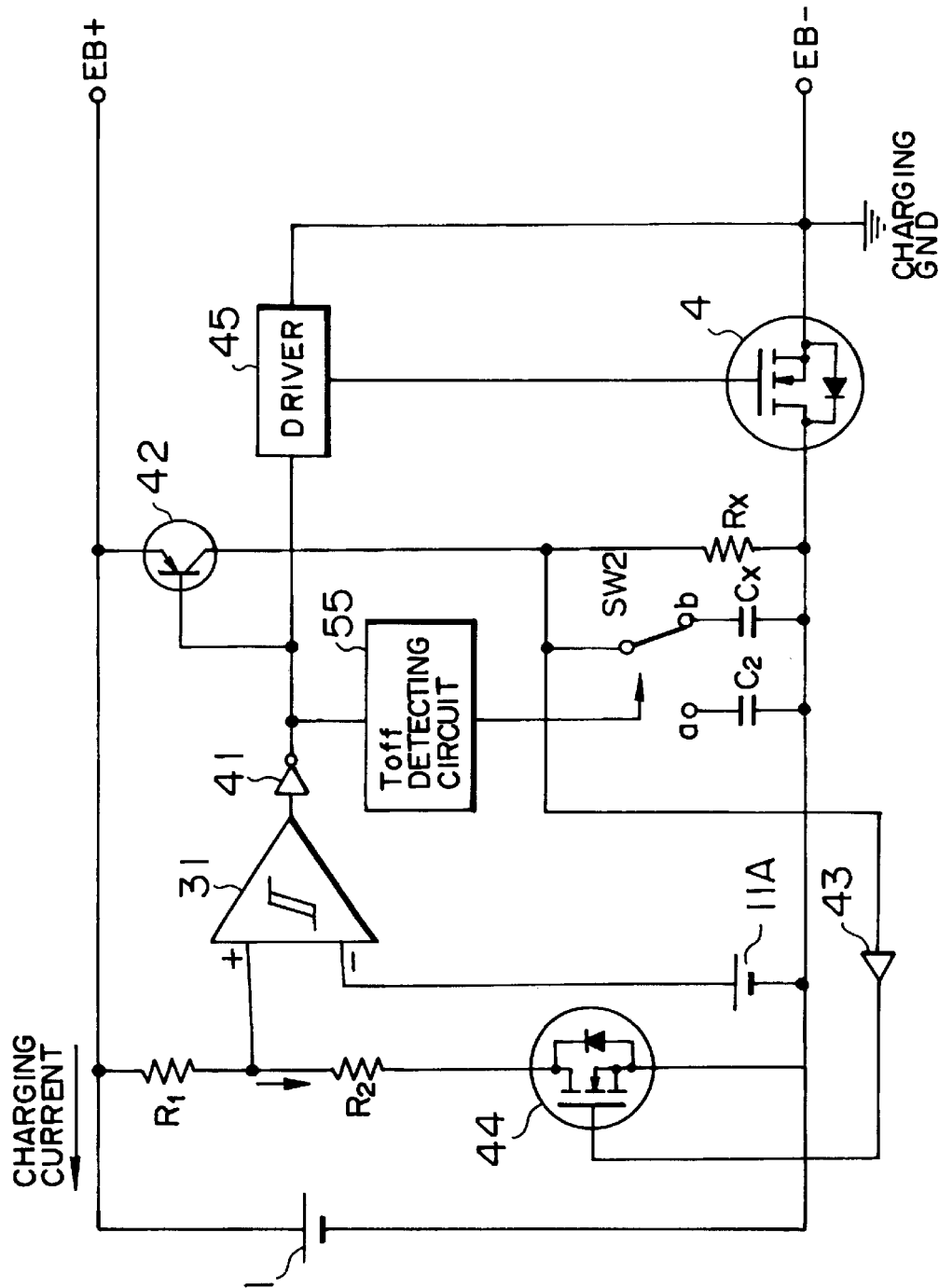
FIG. 26 is an illustration of a construction of a fourth embodiment of the battery pack incorporating the present invention.

FIG. 26 illustrates a construction of a battery pack (in a fourth embodiment to which the present invention is applied) to be charged by the aforementioned second principle. In the figure, corresponding parts to those of FIG. 11 are given the same reference numerals. The battery pack has the same construction as the battery pack of FIG. 11, except that a Toff detection circuit 55, a switch SW2, and a capacitor C2 are further provided.

The output of the inverter 41 is supplied to the Toff detecting circuit. When the output level of the inverter changes from H to L, the Toff detecting circuit starts measuring the time to detect how long the output level of the inverter 41 is continuously L, that is the time required for the battery voltage to drop down to the overcharge detection level. Then, it determines whether Toff is greater than a reference time and generates an H-level output to the SW2, when Toff is determined as being greater than the reference time, that is when the secondary battery 1 is sufficiently charged, or an L-level output to the SW2, when Toff is determined as being less than the reference time, that is the secondary battery 1 is not sufficiently charged.

One end of the capacitor, $C_X$, is connected to the connection point of the transistor 42 and the resistor, $R_X$, through terminal b of switch, SW2, while one end of the capacitor, C2, is connected to the same connection point through terminal a of the switch, SW2. The other ends of the capacitors are connected to the negative terminal of the secondary battery 1. The switch SW2 is such as to select terminal a or b in accordance with the output of the Toff detecting circuit. More specifically, the switch SW2 is such as to select terminal 'a' when the output level of the Toff detecting circuit 55 is H, while it is such as to select terminal 'b' when the output level is L.

The capacity of the capacitor, $C_X$, is set so that Td is set at a value which does not result in detection of −ΔV by an aqueous-type charger, while the capacity of the capacitor, C2, is set at a value sufficiently smaller than the capacity of the capacitor, $C_X$.

In the battery pack having the above-described construction, for some time after the start of charging, since Toff is small, the output level of the Toff detecting circuit is L, which causes the switch SW2 to select terminal b. Therefore, in this case, the aqueous-type charger continues intermittent charging of the battery, without −ΔV being detected.

Thereafter, when the secondary battery 1 is sufficiently charged and Toff becomes greater than the reference time, the output level of the Toff detecting circuit 55 changes from L to H, which causes the switch Sw2 to select terminal 'a'. The capacity of the capacitor, C2, is sufficiently smaller than the capacity of the capacitor, $C_X$, so that when the transistor 42 is turned on, the amount of charge to be supplied to the capacitor, C2, is less than the charge on the capacitor, $C_X$. Therefore, after selection of terminal 'a' by the switch SW2, Td, which corresponds to the time the FET 44 is on, becomes much smaller than that when terminal 'b' has been selected by the switch SW2.

As illustrated in FIG. 25, after sufficient charging of the battery, −ΔV is detected in an aqueous-type charger.

Although in FIG. 25, Toff, although Toff, being greater than the reference time, is represented as having a predetermined fixed very small width, it actually becomes gradually larger as charging of the secondary battery 1 continues.

Although, the capacity of the capacitor, C2, is made sufficiently smaller than the capacity of the capacitor, $C_X$, it may be made sufficiently larger than the capacity of the capacitor, $C_X$. When it is made sufficiently larger, after sufficient charging, Td becomes discretely larger, so that, in this case too, in accordance with the first principle illustrated in FIG. 19, −ΔV is detected in an aqueous-type charger after sufficient charging.

Figure 27:
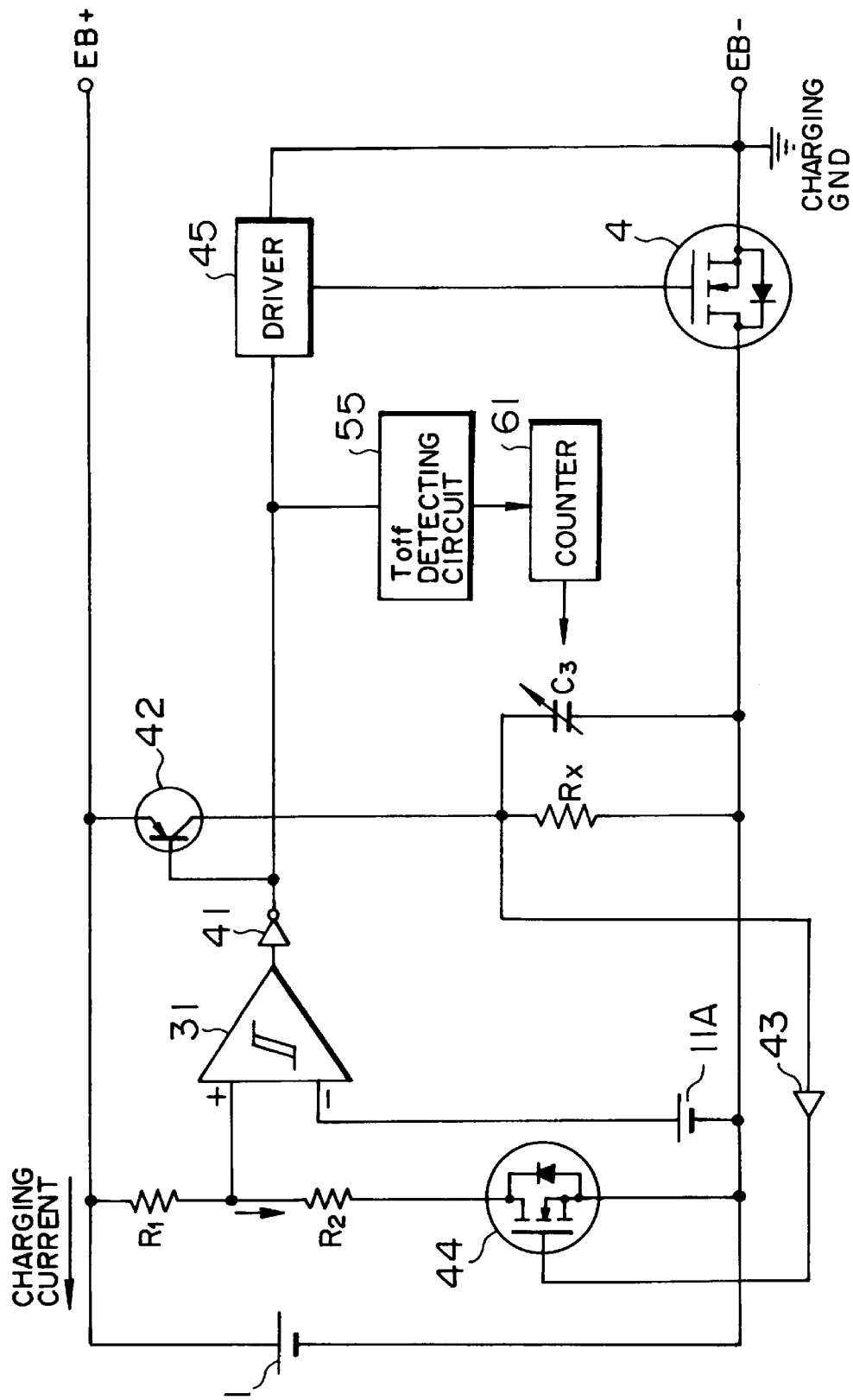
FIG. 27 is an illustration of a construction of a fifth embodiment of the battery pack incorporating the present invention.

FIG. 27 illustrates a construction of a battery pack in a fifth embodiment to which the present invention is applied. In the figure, corresponding parts to those of FIG. 26 are given the same reference numerals. The battery pack of FIG. 27 is charged in accordance with the second principle illustrated in FIG. 25.

The battery pack of FIG. 27 has the same construction as the battery pack of FIG. 11, except that a variable-capacitor, C3, is provided in place of the capacitor, $C_X$, and that a Toff detecting circuit 55 and counter 61 are further provided.

Upon reception of an H-level output from the Toff detecting circuit 55, the counter 61 starts counting the clock pulses supplied from a circuit (not illustrated) and, based on the count value, according to predetermined periods, controls the capacitor, C3, so as to vary its capacity.

Figure 28:
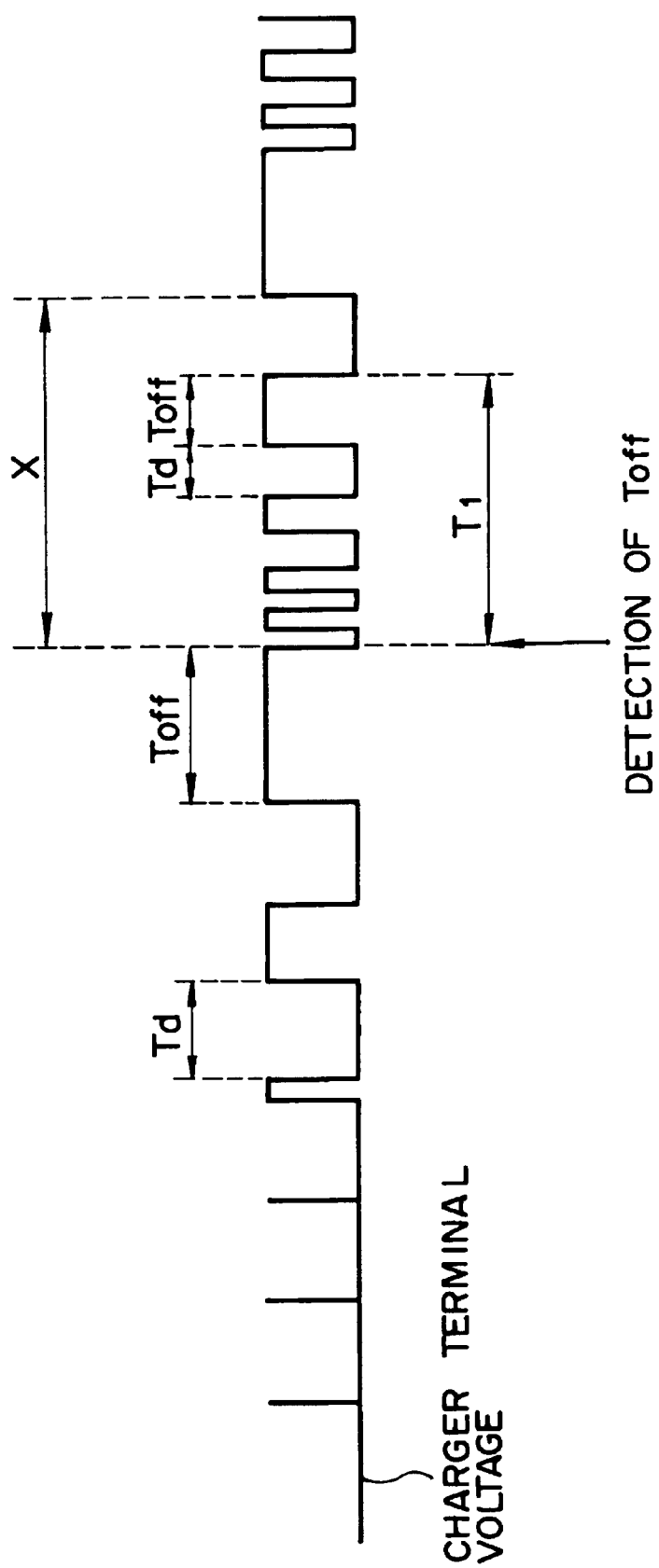
FIG. 28 is an illustration of the operation of the battery pack shown in FIG. 27.

In the battery pack having the above-described construction, a Toff value greater than the reference time causes an H level output to be generated from the Toff detecting circuit 55. Upon reception of an H level output from the Toff detecting circuit 55, the counter 61 starts to count the clock pulses and, as illustrated in FIG. 28, decreases the capacity of the capacitor, C3, so that Td becomes very small. Therefore, thereafter $-\Delta V$ is detected, as illustrated in FIG. 26.

According to the second principle, as illustrated in FIG. 25B, after a relatively long Toff ends, a peak point occurs, after which the moving average value, which is smaller than the moving average value at the peak point, varies in a zigzag fashion. It is possible that failure in the detection of $-\Delta V$ occurs within the range the moving average value changes in a zigzag fashion.

As illustrated in FIG. 26, although immediately after Td has become very small, Toff also becomes small, Toff gradually increases as the charging of the secondary battery 1 continues, so that when a failure in detection of the $-\Delta V$ value by an aqueous-type charger occurs within the range the moving average value varies in a zigzag fashion, a pseudo $-\Delta V$ value does not appear.

Therefore, it is preferable that a pseudo $-\Delta V$ value repeatedly appears. To achieve this, in the battery pack of FIG. 27, the voltage between the terminals of a charger is in the form of a waveform between interval X of FIG. 28 which occurs repeatedly.

More specifically, upon reception of an H-level signal from the Toff detecting circuit 55, the counter 61, as described above, starts to count the clock pulses, and determines whether time T1 (where T1 is greater than Ta) has elapsed from the reception of H-level signal from the Toff detecting circuit 55. Upon elapse of time, T1, from the reception of an H-level signal from the Toff detecting circuit 55, the counter 61 causes the capacity of the capacitor C3 to return to the original value. As illustrated in FIG. 28, since this also causes Td to return to the original value, the charging current flows for a longer period of time than before. Therefore, a longer time, Toff, is required for the battery voltage to drop down to the overcharge detection level from the time the charging current is turned off.

After a long time period, Toff, occurs, the counter 61 resets the count value and re-counts the clock pulses, and, at the same time, varies the capacity of the capacitor, C3, so that Td becomes extremely small.

The same operations are hereafter repeated until the battery charging by the aqueous-type ends. Therefore, in this case, $-\Delta V$ can be unfailingly detected by the aqueous-type charger.

Although in the foregoing description, after Toff has become greater than the reference time, Td becomes very small and remains at that very small value until time, T1, has elapsed, it is possible to gradually decrease this value down to the original value from the time Td is very small. This can be achieved by increasing the capacity of the capacitor, C3, with increasing count value of the counter 61.

In this case, it is possible to make Td very large after Toff has become greater than the reference time, and gradually decrease this value to a small value with the passage of time. (In this case, Toff also becomes gradually smaller.) This is achieved by increasing the capacity of the capacitor, C3, when the count value of the counter 61 is 0, and then decreasing the capacity of this capacitor, C3, with increasing count value. In this case, $-\Delta V$ is determined based on the first principle illustrated in FIG. 19.

Figure 29:
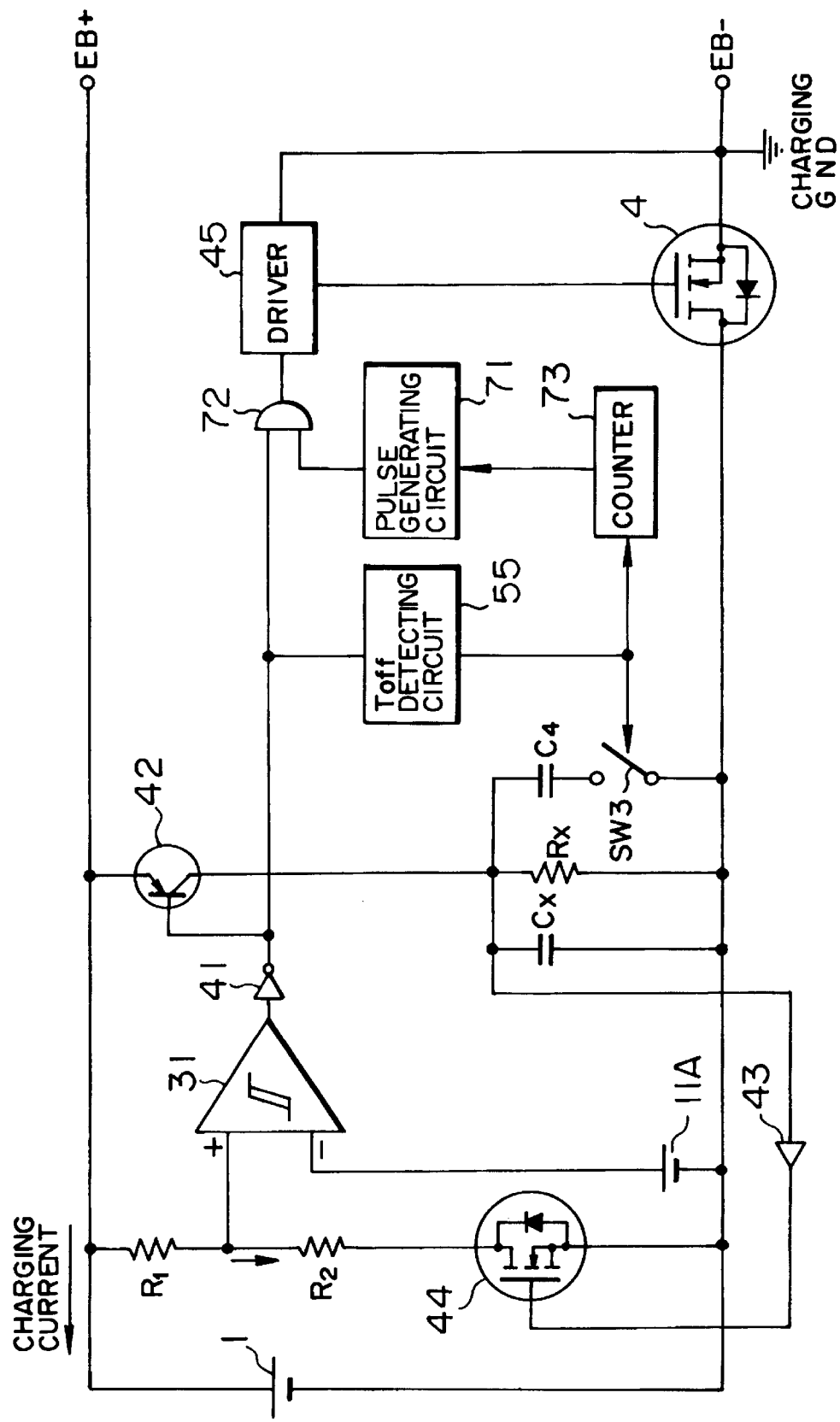
FIG. 29 is an illustration of a construction of a sixth embodiment of the battery pack incorporating the present invention.

FIG. 29 illustrates a construction of a battery pack in a sixth embodiment to which is applied the present invention. In the figure, corresponding parts to those of FIGS. 11 and 27 are given the same reference numerals. This battery pack is charged in accordance with the second principle illustrated in FIG. 25.

The battery pack of FIG. 29 has the same construction as the battery pack of FIG. 11, except that the battery pack of FIG. 29 has a capacitor, C4, a switch SW3, Toff detecting circuit 55, a pulse generating circuit 71, an AND gate 72, and a counter 73.

One end of the capacitor, C4, is connected to the connection point of the transistor 42 and the resistor, $R_X$, while the other end is connected to the negative terminal of the secondary battery 1 through the SW3. The SW 3 is turned on, when the Toff detecting circuit 55 produces an L-level output, while it is turned off when the Toff detecting circuit 55 produces an H-level output.

Upon reception of an H-level signal from the Toff detecting circuit 55, the counter 73 starts counting the clock pulses supplied from a circuit (not shown), and controls the pulse generating circuit 71 every predetermined period based on the count value.

The pulse generating circuit 71, which usually generates an H-level signal, generates an L-level signal having a predetermined time width only when it receives a control signal from the counter 73. One of the input terminals of the AND gate 72 is connected to the pulse generating circuit 71, while the other input terminal is connected to the inverter 41. The AND gate 72 outputs a logical AND of the pulse generating circuit 71 output and the inverter 41 output to the driver 45. Therefore, while the pulse generating circuit 71 is generating an L-level signal of the predetermined time width, FET 4 is turned off, whereas, in other cases, the FET 4 is turned on or off depending on the output from the comparator 31 via the inverter 41.

The capacity of the capacitor, $C_X$, and capacitor, C4, connected in parallel (hereinafter referred to as "parallel capacity") is set at a value such that in Td detection of $-\Delta V$ by an aqueous-type charger is not carried out. The capacity of the capacitor, $C_X$, is made sufficiently smaller than the parallel capacity.

Figure 30:
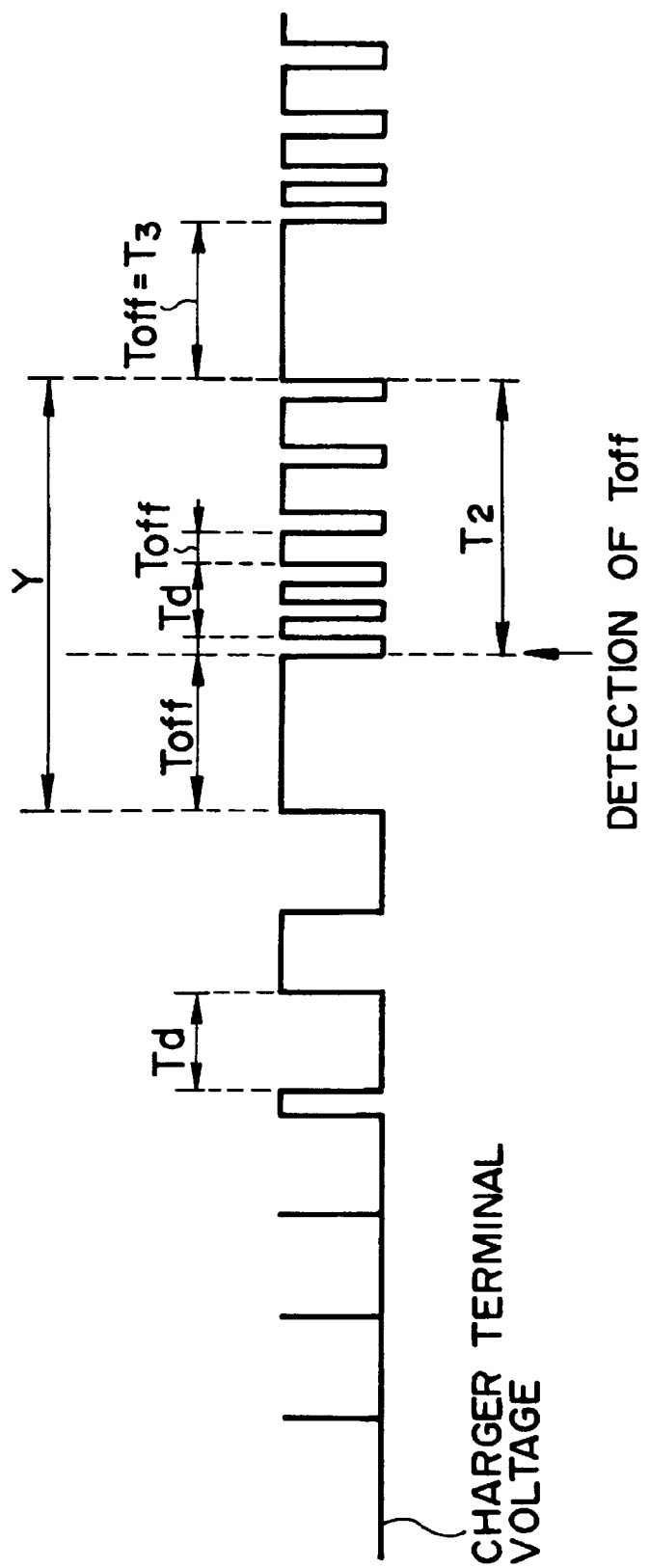
FIG. 30 is an illustration of the operation of the battery pack shown in FIG. 29.

A description will now be made of the operation, with reference to the waveform of the voltage between the terminals of an aqueous-type charger of FIG. 30. Toff is short for some time after the start of charging, so that Toff detecting circuit 55 produces an L-level output, which turns on the switch SW3. In addition, since the pulse generating circuit 71 is generating an H-level signal, the signal, generated from the comparator 31 via the inverter 41, is output to the driver 45 from the AND gate. Therefore, in this case, in the aqueous-type charger intermittent charging continues, without detection of $-\Delta V$.

When the secondary battery 1 is sufficiently charged and Toff becomes greater than the reference time, the output level of the Toff detecting circuit 55 changes from L to H, which turns off the switch SW3. As mentioned above, the capacity of the capacitor, $C_X$, is sufficiently less than the parallel capacity, so that, as in FIG. 26, after the switch SW3 has been turned off, Td, which corresponds to the period FET 44 is on, becomes much smaller than when the switch SW3 is on.

Therefore, upon occurrence of Toff greater than the reference time, the voltage between the terminals of a charger becomes as illustrated in FIG. 28.

When the output level of the Toff detecting circuit 55 changes from L to H, the counter 73 starts counting clock pulses and determines whether time, T2, (where T2 is greater than Ta) has elapsed from the time the output level of the Toff detecting circuit 55 is H. Thereafter, when time T2 elapses from the time the output level of the Toff detecting circuit 55 is H, the counter 73 generates an L-level signal having a predetermined time width, T3, to the pulse generating circuit 71.

During T3, the output level of the AND gate 72 is L, regardless of the output level of the comparator 31, which causes the FET 4 to be off during this time. This results in, as illustrated in FIG. 30, the occurrence of Toff having the same length as the predetermined time width, T3, in the voltage between terminals of a charger, after the passage of time, T2, from the time Toff, being greater than the reference time, is detected.

Then, the counter 73 resets the count value and restarts counting of the clock pulses.

The same operations are hereafter repeated until charging by the aqueous-type charger ends. Therefore, in this case, after Toff becomes greater than the reference time, the waveform, between the interval Y of FIG. 30, occurs repeatedly, so that even in this battery pack $-\Delta V$ can be unfailingly detected by an aqueous-type charger, as in the case illustrated in FIG. 27.

Figure 31:
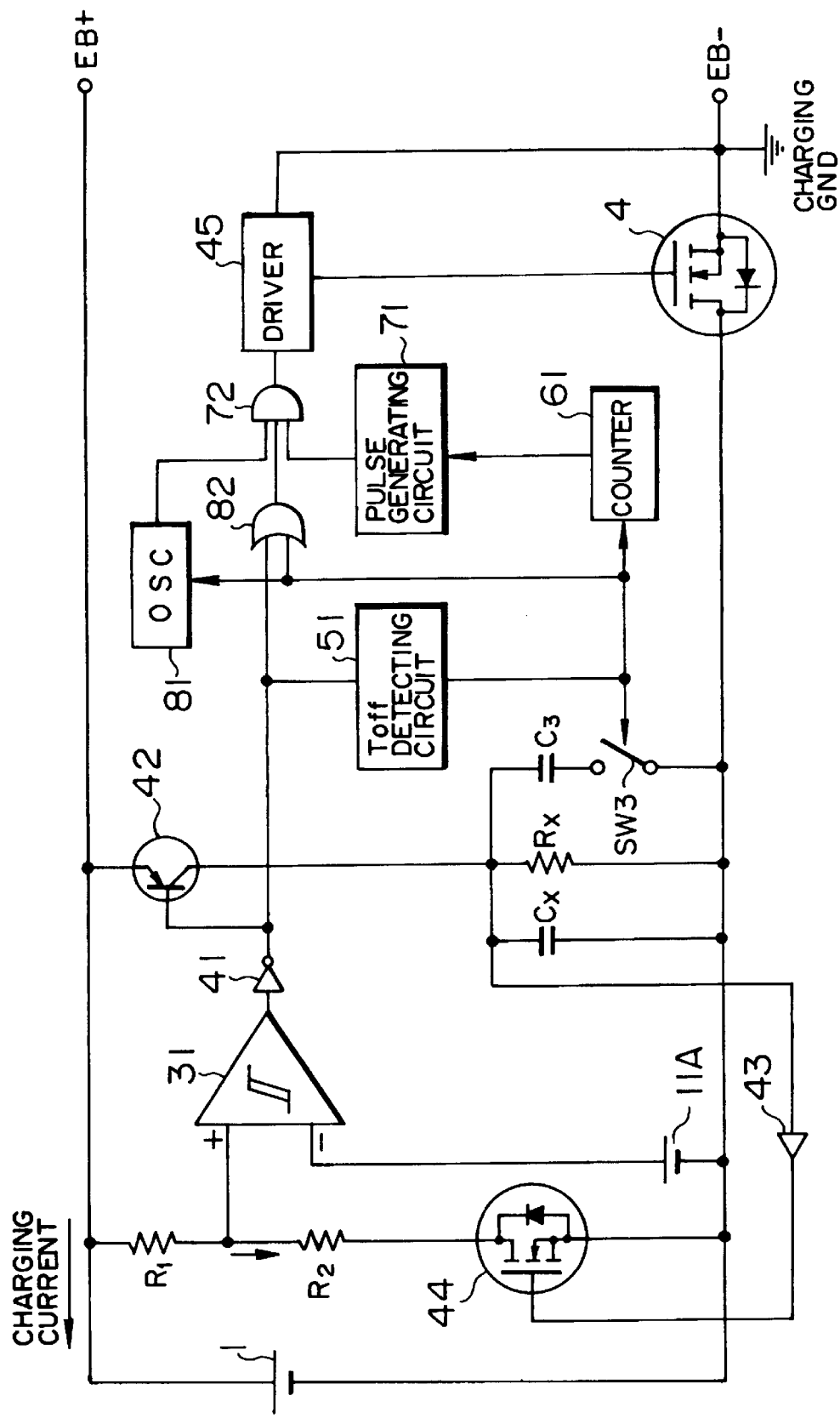
FIG. 31 is an illustration of a construction of a seventh embodiment of the battery pack incorporating the present invention.

FIG. 31 illustrates a construction of a battery pack in a seventh embodiment to which is applied the present invention. In the figure, corresponding parts to those of FIG. 29 are given the same reference numerals. This battery pack is charged in accordance with the second principle illustrated in FIG. 25.

In this battery pack, the output of the Toff detecting circuit is supplied to one of the input terminals of an OR gate 82, while the other input terminal has supplied thereto the output of inverter 41. The output terminal of the OR gate 82 is connected to a first input terminal of a 3-input AND gate 83.

The output of the Toff detecting circuit 55 is supplied to an oscillator 81. Upon reception of an H-level signal from the Toff detecting circuit 55, that is when Toff becomes greater than the reference time, the oscillator 81 starts to operate to generate a high-frequency pulse with a small width. The output of the oscillator 81 is supplied to a second input terminal of the AND gate 83. It is to be noted that the oscillator 81 generates an H-level pulse while it is receiving an L-level signal from the Toff generating circuit 55.

The output of the pulse generating circuit 71 is supplied to a third input terminal of the AND gate 83. The output terminal is connected to the driver 45.

The capacity of the capacitor, $C_x$, is set so as not to allow, in Td, detection of $-\Delta V$ by the aqueous-type charger.

Figure 32:
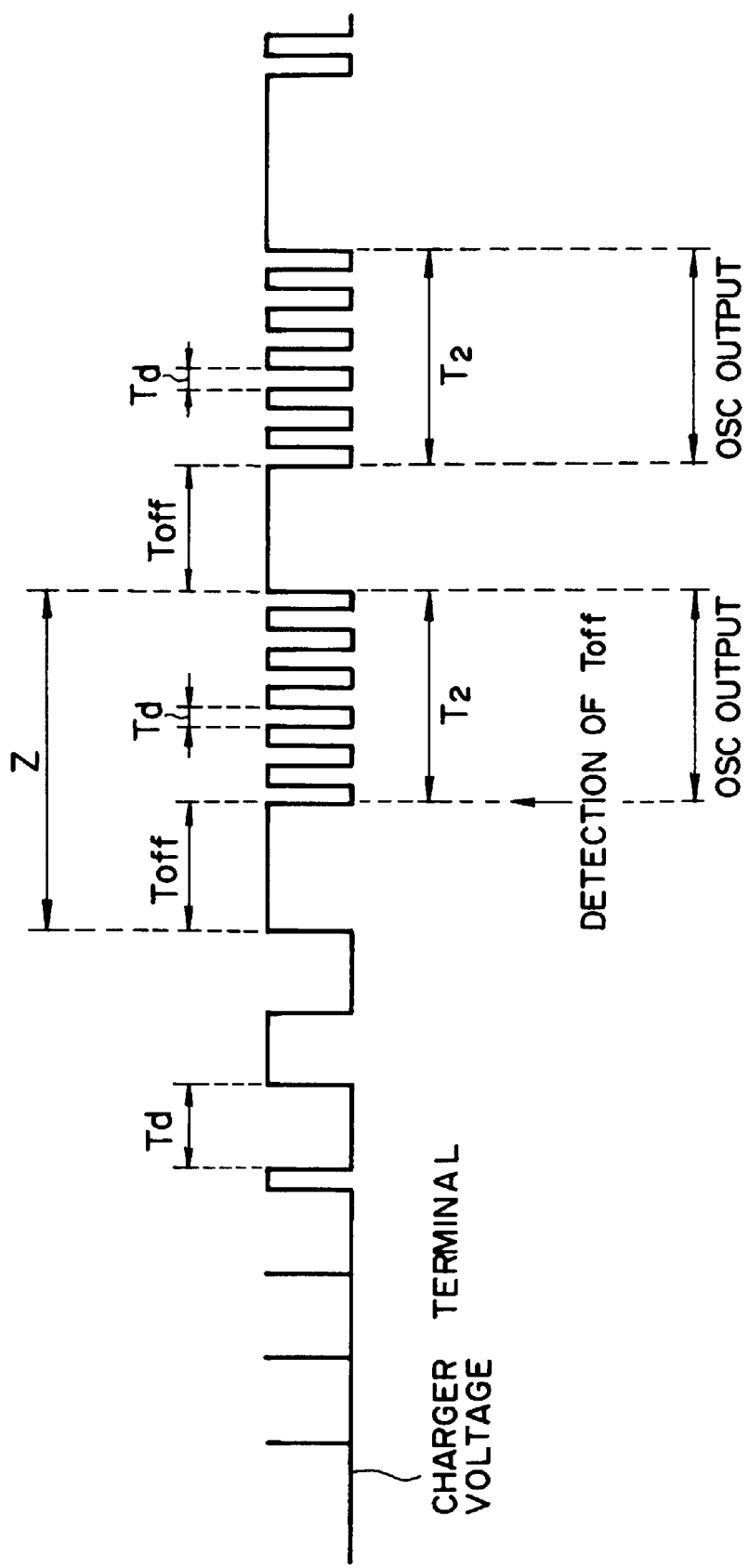
FIG. 32 is an illustration of the operation of the battery pack shown in FIG. 31.

A description will now be made of the operation, with reference to FIG. 32 which illustrates a waveform of the voltage between terminals of an aqueous-type charger. Since Toff is short for some time after the start of charging, the output level of the Toff detecting circuit 55 is L, so that the output of the comparator 31, generated via the inverter 41, is supplied from the OR gate 82 to the AND gate 83. As described above, in this case, the output level of the pulse generating circuit 71 and the oscillator 81 is L, so that the output of the AND gate 83 becomes the output of the OR gate 82.

As can be understood from the foregoing description, the output of the comparator 31 is supplied to the driver 45 via the inverter 41. Since the capacity of the capacitor, $C_x$, is set at a value which does not allow, in Td, detection of $-\Delta V$ by the aqueous-type charger intermittent charging is continued, without detection of $-\Delta V$ in the aqueous-type charger until after Toff becomes greater than the reference time.

When the secondary battery 1 is sufficiently charged and Toff becomes greater than the reference time, the output of the Toff detecting circuit 55 changes from L to H, so that an H-level signal is always generated from the OR gate 82, regardless of the output level of the comparator 31.

In this case, the oscillator 81 starts generating a high-frequency pulse having a small width. Although the counter 73 starts counting the clock pulses, the pulse generating circuit 71 only operates after time T2 has elapsed from the time the Toff detecting circuit 55 generates an H-level signal, so that the output of the pulse generating circuit 71 remains at H.

Therefore, the signal, generated from the oscillator, is output from the AND gate 83 as it is, according to which signal the FET 4 is driven. As illustrated in FIG. 32, this causes the voltage between terminals of a charger to have a waveform in correspondence with a high-frequency pulse with a small width (the pulse being generated from the oscillator 81) until the passage of time, T2, from the time the Toff detecting circuit 55 generates an H-level signal.

As can be understood from the foregoing description, after detection of Toff greater than the reference time, a pseudo $-\Delta V$ is detected, as illustrated in FIG. 25.

If a failure in detection of $-\Delta V$ occurs, the counter 73 generates an L-level signal having a predetermined time width, T3, to the pulse generating circuit 71, after the passage of time, T2, from the time the Toff detecting circuit 55 generates an H-level signal, as illustrated in FIG. 29.

During T3, the output level of the AND gate 83 is L, regardless of the output level of the oscillator 81, during which time the FET 4 is off. As illustrated in FIG. 32, this causes Toff, being of the same size as the predetermined time width T3, to occur in the voltage between terminals of the charger after passage of time, T2, from the time Toff is greater than the reference time.

Thereafter, the counter 73 resets the count value and recounts the clock pulses.

The same operations are hereafter repeated until the charging by an aqueous-type charger ends. Therefore, in this case, after Toff becomes greater than the reference time, the waveform, between Z in FIG. 32, repeatedly occurs, so that even in this battery pack, $-\Delta V$ is unfailingly detected in the water-type charger, as in the case illustrated in FIG. 27.

Charging experiments were conducted on the battery packs having the aforementioned constructions, using the aqueous-type chargers having the following specifications. In each experiment, after sufficient charging, $-\Delta V$ was detected.

(1) AC-V30 (manufactured by Sony)
    charging current: 1.1 A
    no-load voltage: 10 v
    $\Delta Vd$: 80 mV
    averaging width Tab: 16 seconds
    Ta: 60 seconds (2) AC-S10, BC-S10 (manufactured by Sony)
    charging current: 1.3 A
    no-load voltage: 10 V
    $\Delta Vd$: 60 mV
    averaging width Tab: 16 seconds
    Ta: 60 seconds (3) AC-S25 (manufactured by Sony)
    charging current: 1.1 A
    no-load voltage: 10 V
    $\Delta Vd$: 60 mV
    averaging width Tab: 16 seconds
    Ta: 30 seconds The present invention can be applied to an adapter for connecting the battery pack and the charger, although the present invention has been applied to a battery pack in the foregoing description.

A plurality of secondary batteries can be included in the battery pack, although only one secondary battery is included in the battery pack in the embodiment. When there are a plurality of secondary batteries, overcharge detection and the like can be performed for each secondary battery.

The system, described with reference to FIGS. 21 to 24, is an example of application of charging based on the first principle. It can also be used as an example of application of charging based on the second principle.

The present invention is applicable to the battery pack of the type illustrated in FIGS. 5 and 7, although in the embodiment, the present invention was applied to the battery pack of the type shown in FIG. 11 (FIG. 9).

Figure 33:
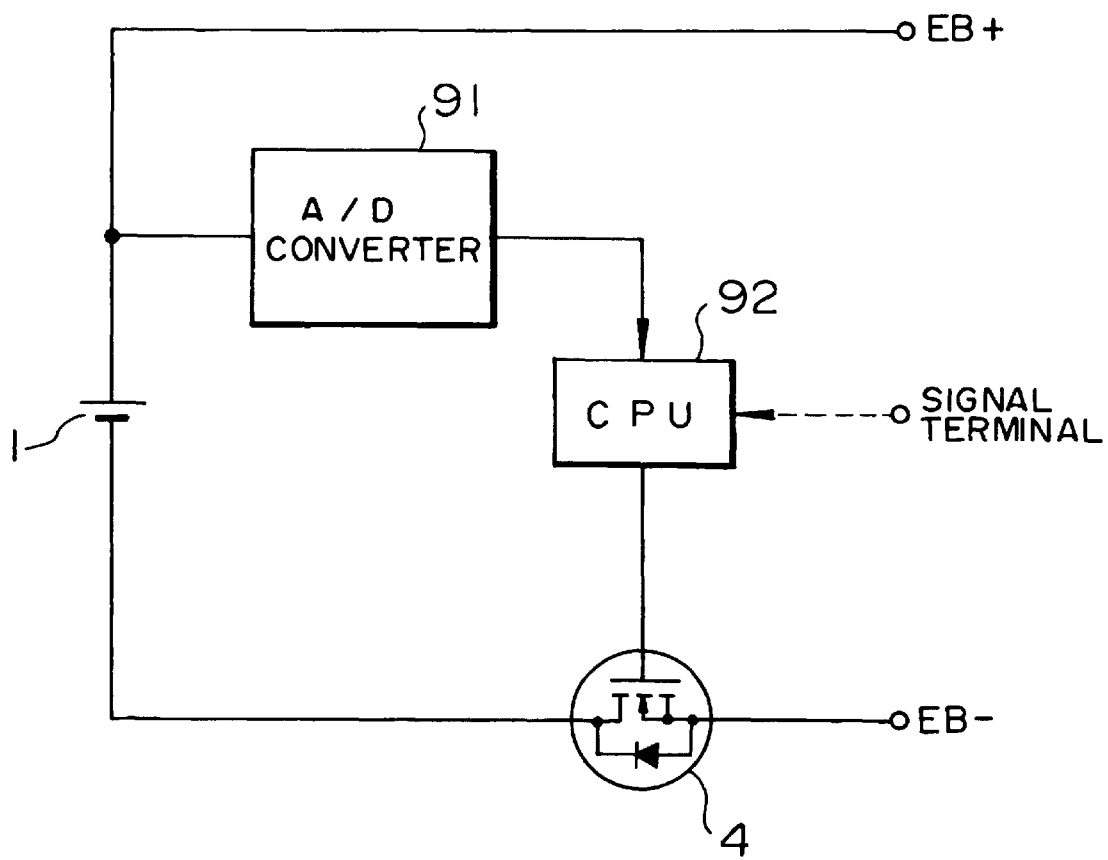
FIG. 33 is an illustration of a construction of an eighth embodiment of the battery pack incorporating the present invention.

Although in the embodiment, the battery pack includes devices such as a comparator, a transistor, a resistor, a capacitor, and a diode, the aforementioned functions may be realized using software. In this case, the battery pack is constructed as illustrated for example in FIG. 33.

In this battery pack, the voltage of the secondary battery 1, which is subjected to analog-to-digital conversion by an A/D converter 91, is supplied to a CPU 92. At the CPU 92, the aforementioned overcharge detection, Toff detection, overcharge control by turning on/off the FET 4, etc., are performed in accordance with a predetermined program. In this case, as indicated by the dotted line in FIG. 33, a signal terminal is included in the battery pack. Unlike the −ΔV detection method in accordance with aqueous-type charger, in this example, allowing the aqueous-type charger to supply a signal based on its specification makes it possible, in accordance with the amount of charging current, to perform a more suitable FET 4 on/off control (setting of the frequency of a signal (pulse) which causes the FET 4 to be turned on/off, duty ratio, etc.) and setting of the timing Td is made large or small.

In addition, in this case, it is possible to easily set a proper capacity for the secondary battery 1 and to perform operations which match the construction of the battery pack.

What is claimed is:

1. A battery charging control apparatus for controlling charging of a secondary battery, comprising:

controlling means for performing control of an intermittent charging in such a manner that, when the voltage of said secondary battery which is being charged has risen to a level not lower than a predetermined reference level, the supply of the charging current is suspended after being forcibly supplied to said secondary battery for a predetermined forced charging time and, when the voltage of said secondary battery has come down to said reference voltage after the suspension of the supply of said charging current, said charging current is supplied again to said secondary battery, the suspension of supply of said charging current and the forced supply of said charging current being alternately and repeatedly performed; and switching means controlled by said controlling means so as to turn on and off said charging current;

wherein said controlling means being arranged to vary the forced charging time in accordance with the progress of the charging of said secondary battery.

2. A battery charging control apparatus according to claim 1, wherein said controlling means progressively prolongs said forced charging time in accordance with the progress of the charging of said secondary battery.

3. A battery charging control apparatus according to claim 1, wherein said controlling means increases said forced charging time in a discrete manner when a predetermined battery voltage is reached as a result of the progress of the charging.

4. A battery charging control apparatus according to claim 1, further comprising:

judging means which measures the length of voltage reduction time required for the voltage of said secondary battery to be reduced to said predetermined reference voltage during the suspension of supply of said charging current and determines whether said voltage reduction time is not shorter than a predetermined reference time;

wherein said controlling means controls said switching means such that said forced charging time after said voltage reduction time has become not shorter than said reference time is longer than the forced charging time employed when said voltage reduction time is still shorter than said reference time.

5. A battery charging control apparatus according to claim 1, further comprising:

judging means which measures the length of voltage reduction time required for the voltage of said secondary battery to be reduced to said predetermined reference voltage during the suspension of supply of said charging current and determines whether said voltage reduction time is not shorter than a predetermined reference time;

wherein said controlling means controls said switching means such that said forced charging time after said voltage reduction time has become not shorter than said reference time is shorter than the forced charging time employed when said voltage reduction time is still shorter than said reference time.

6. A battery charging control apparatus according to claim 5, wherein said controlling means controls said switching means in two phases including a first phase in which said forced charging time is progressively shortened and a subsequent second phase which includes repeating turning on and off of said switching means at a predetermined period of repetition with a constant off time length.

7. A battery charging method according to claim 1, wherein said controlling means controls said switching means in such a manner as to keep said switching means off for a predetermined period after suspension of supply of the charging current, regardless of the voltage of said secondary battery.

8. A battery charging apparatus according to claim 1, wherein said controlling means turns said switching means on and off at a high switching frequency during said forced charging time.

9. A battery charging control apparatus for controlling charging of a secondary battery, comprising:

controlling means for performing control of an intermittent charging in such a manner that, when the voltage of said secondary battery which is being charged has risen to a level not lower than a predetermined reference level, charging current is suspended after being forcibly supplied to said secondary battery for a predetermined forced charging time and, when the voltage of said secondary battery has come down to said reference voltage after the suspension of the supply of said charging current, said charging current is supplied again to said secondary battery, the suspension of supply of the charging time and the forced supply of said charging current being alternately and repeatedly performed; and switching means controlled by said controlling means so as to turn on and off said charging current;

wherein said controlling means being arranged to vary the length of time of suspension of the supply of the charging current in accordance with the progress of the charging of said secondary battery.

* * * * *